(12) United States Patent
Polakowski et al.

(10) Patent No.: US 7,594,557 B2
(45) Date of Patent: Sep. 29, 2009

(54) SNOWMOBILE REAR SUSPENSION SYSTEM

(75) Inventors: Stephen E. Polakowski, Houghton, MI (US); Steven G. Mattson, Houghton, MI (US); Christian Muehlfeld, Chassell, MI (US)

(73) Assignee: Great Lakes Sound & Vibration, Inc., Houghton, MI (US)

( * ) Notice: Subject to any disclaimer, the term of this patent is extended or adjusted under 35 U.S.C. 154(b) by 400 days.

(21) Appl. No.: 11/398,333

(22) Filed: Apr. 5, 2006

(65) Prior Publication Data
US 2006/0180370 A1 Aug. 17, 2006

Related U.S. Application Data

(60) Continuation-in-part of application No. 11/104,818, filed on Apr. 13, 2005, now Pat. No. 7,128,180, which is a division of application No. 10/654,195, filed on Sep. 3, 2003, now Pat. No. 6,926,108.

(60) Provisional application No. 60/407,913, filed on Sep. 3, 2002.

(51) Int. Cl.
*B62M 27/00* (2006.01)
*B62M 29/00* (2006.01)

(52) U.S. Cl. .................. 180/190; 180/193; 305/127; 305/128

(58) Field of Classification Search ............. 180/190, 180/193; 305/127, 128
See application file for complete search history.

(56) References Cited

U.S. PATENT DOCUMENTS 1,916,375 A 7/1933 Knickerbocker 3,773,126 A * 11/1973 Irvine .................. 180/9.58
3,840,083 A 10/1974 Woods (Continued)

OTHER PUBLICATIONS

Kaduce, Larry A., Scorpion and Trailroamer Bite The Dust; Aug. 1, 2001, http://www.grovetontrailblazers.com/news/trailroamer1.htm, pp. 1-3, last visited on Oct. 1, 2002 10:52 AM.

(Continued)

*Primary Examiner*—Lesley D Morris
*Assistant Examiner*—Marlon A Arce
(74) *Attorney, Agent, or Firm*—Andrus, Sceales, Starke & Sawall, LLP

(57) ABSTRACT

A suspension assembly for a snowmobile is provided that rotatably supports a closed-loop track in the rear tunnel of the snowmobile and also supports both vertical and horizontal travel of said closed-loop track during suspension system travel. The suspension assembly includes at least one elongated ground contact that supports rotational travel of the closed loop track and at least one swing arm angularly disposed in the closed-loop track and having a front end portion pivotably coupled to the rear tunnel and a rear end portion coupled to the at least one ground contact. In the preferred arrangement, a front resilient member is arranged to bias against displacement between the chassis and the at least one ground contact during suspension assembly travel and a rear resilient member arranged to bias against displacement between the chassis and the swing arm during suspension assembly travel. A tensioner couples the rear end portion of the swing arm to the at least one ground contact. The tensioner is extendable and retractable during movement of the suspension assembly to maintain the closed loop track at a generally uniform tension during assembly movement.

13 Claims, 18 Drawing Sheets

U.S. PATENT DOCUMENTS

| | | | |
|---|---|---|---|
| 3,879,092 A | | 4/1975 | Rose |
| 3,887,023 A | | 6/1975 | Henning |
| 4,407,386 A | * | 10/1983 | Yasui et al. ............... 180/193 |
| 5,014,805 A | | 5/1991 | Uchida |
| 5,113,958 A | | 5/1992 | Holden |
| 5,265,692 A | * | 11/1993 | Mallette ............... 180/193 |
| 5,667,031 A | | 9/1997 | Karpik |
| 5,692,579 A | * | 12/1997 | Peppel et al. ............... 180/190 |
| 5,727,643 A | | 3/1998 | Kawano et al. |
| 5,860,486 A | | 1/1999 | Boivin et al. |
| 5,881,834 A | * | 3/1999 | Karpik ............... 180/193 |
| 5,944,134 A | | 8/1999 | Peppel et al. |
| 6,032,752 A | | 3/2000 | Karpik et al. |
| 6,032,754 A | | 3/2000 | Izumi et al. |
| 6,070,683 A | | 6/2000 | Izumi et al. |
| 6,234,263 B1 | | 5/2001 | Boivin et al. |
| 6,234,264 B1 | * | 5/2001 | Boivin et al. ............... 180/193 |
| 6,237,706 B1 | | 5/2001 | Karpik et al. |
| 6,263,991 B1 | | 7/2001 | Savage et al. |
| 6,321,864 B1 | | 11/2001 | Forbes |
| 6,354,389 B1 | | 3/2002 | Zaczkowski et al. |
| 6,357,543 B1 | | 3/2002 | Karpik |
| 6,390,219 B1 | * | 5/2002 | Vaisanen ............... 180/193 |
| 6,394,204 B1 | | 5/2002 | Haringer |
| 6,502,651 B2 | | 1/2003 | Zaczkowski et al. |
| RE38,124 E | * | 5/2003 | Mallette et al. ............ 180/193 |
| 6,631,778 B2 | | 10/2003 | Mallette |

OTHER PUBLICATIONS

Track Suspension Today, The Adjustables, Part 1: Origin & Nomenclature; Supertrax International, Fall 2002, pp. 45-49.

Trail Roamer, Marine Hunting and Outdoor Magazine, pp. 1-3, http://www.sportingjournal.com/main18.shtml, last visited Oct. 1, 2002.

Mountain Addiction Billet Suspension, see www.mountainaddiction.com/pages/1/index.htm, last visited Jun. 9, 2006.

Adboivin Expert, see www.adboivin.com/en/expert.html, last visited Jun. 9, 2006.

* cited by examiner

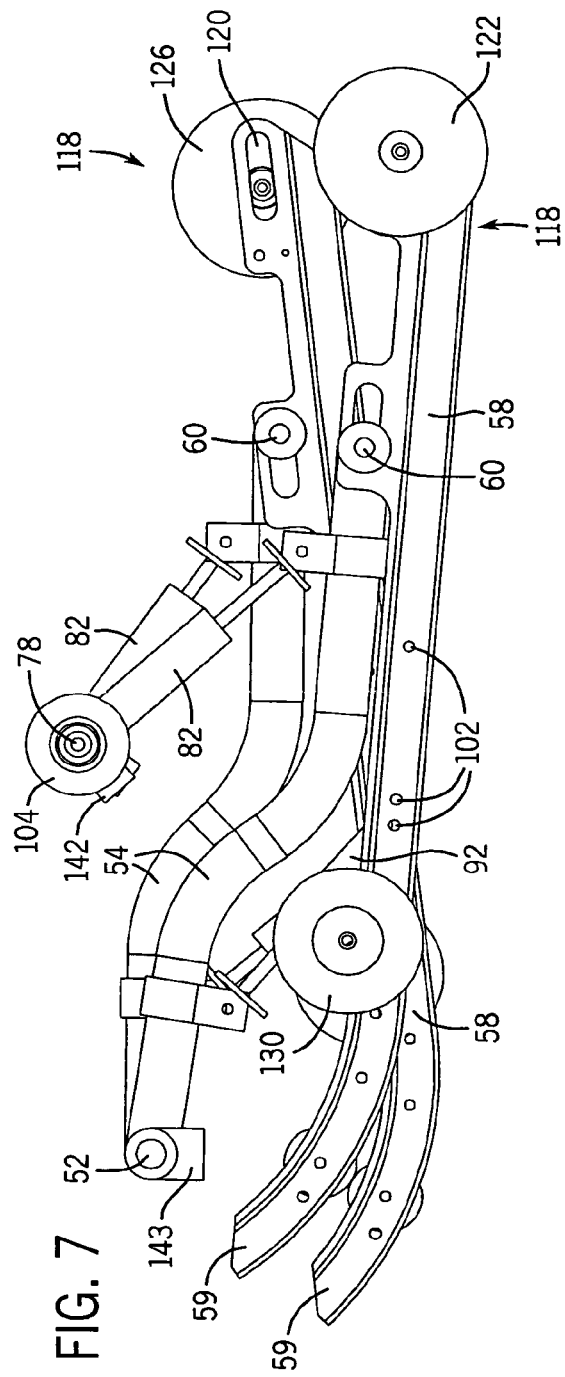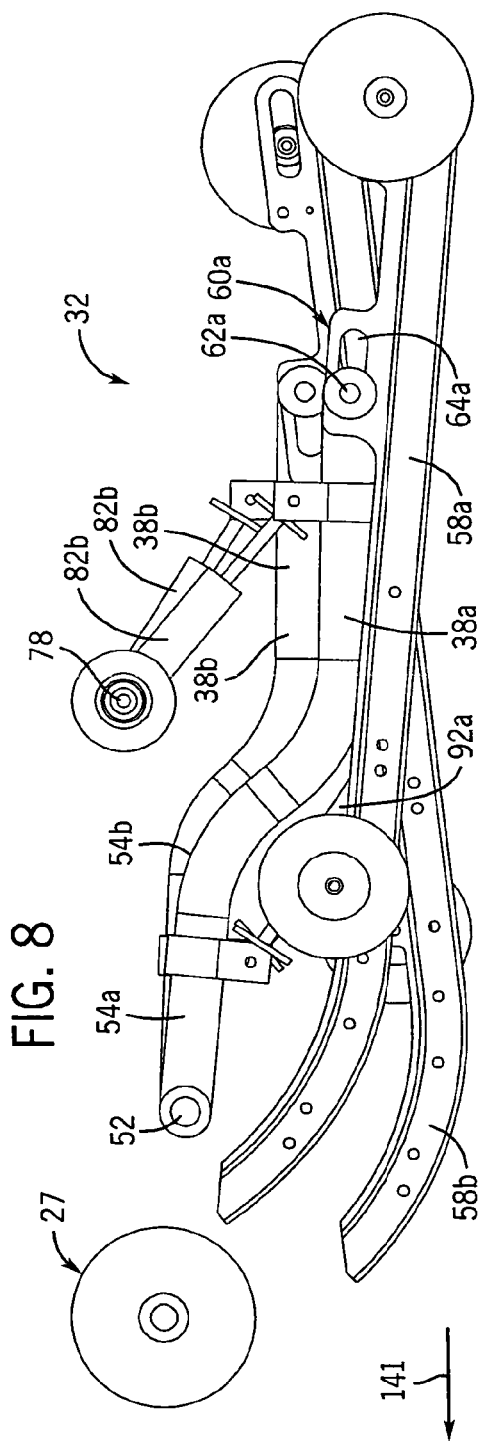

SNOWMOBILE REAR SUSPENSION SYSTEM

CROSS REFERENCE TO RELATED APPLICATIONS

The present application is a continuation-in-part of U.S. patent application Ser. No. 11/104,818, filed Apr. 13, 2005 now U.S. Pat. No. 7,128,180, which is a divisional of U.S. patent application Ser. No. 10/654,195, filed Sep. 3, 2003, now U.S. Pat. No. 6,926,108, which claims the benefit of U.S. Provisional Application No. 60/407,913, filed Sep. 3, 2002.

FIELD OF THE PRESENT APPLICATION

The present application relates to a suspension assembly for a snowmobile.

BACKGROUND OF THE INVENTION

The parent applications provide an independent suspension system for a snowmobile that is capable of supporting the snowmobile while independently tensioning and articulating multiple rear tracks through a defined suspension travel. The parent applications also provide a suspension assembly that tensions and articulates each closed-loop track on the snowmobile through both vertical and horizontal suspension travel paths to maximize traction and maneuverability in each of the tracks.

Such a system and assembly present many desirable results. For example, the system allows one side or corner of the suspension to deflect and begin to absorb shock to a point where the second side is engaged. This eliminates roll moments and reduces shock imposed on the snowmobile and rider. In turn, this minimizes rider fatigue and maximizes rider control. In addition, the system and assembly maximize traction because more track area is applied to the ground as the suspension displaces independently.

By the present application, it is recognized as desirable to provide a suspension assembly for a snowmobile driven by a single closed-loop track that maximizes performance and maneuverability by placing increased track area on the ground surface as the snowmobile accelerates, decelerates and maneuvers over both smooth and rough terrain. It is further recognized as desirable to provide such an assembly that is adjustable, lightweight, easy to construct, and that requires minimal parts, thus minimizing mechanical breakdown.

SUMMARY OF THE INVENTION

The present application utilizes the structure taught in the parent applications and teaches an assembly that is designed to operate within a single closed-loop track in the snowmobile's rear tunnel. As will be apparent from the present description, many of the structural and functional aspects and advantages of the suspension assembly of the present application are the same as, or similar to those described for the independent suspension system and assembly of the parent applications.

The unique suspension assembly of the present application supports and tensions the rotating track during snowmobile travel and allows for increased contact between the track area and the ground during suspension system travel. This advantageously provides increased traction and increased snowmobile maneuverability and performance. The assembly maximizes the transference of power from the drive system to the ground by providing such increased track contact with the ground. The assembly is movable in both a vertical and horizontal directions, thus maintaining track form and tension during acceleration, deceleration and rough terrain conditions. The assembly is easily manufactured and requires minimal parts, thus minimizing mechanical breakdown. The assembly is adjustable, maximizes performance in accordance with the objects discussed above, and minimizes overall system weight. The assembly provides a weight reduction of 12 to 18 lbs or a 30 to 40% weight reduction over existing art without causing structural or functional failure.

A preferred embodiment of the suspension assembly employs a plurality of elongated ground contacts, and preferably two ground contacts for supporting a closed-loop track during its driven rotational path. An elongated suspension linkage or swing arm is disposed at an angle in the closed-loop track. The front end portion of the swing arm is coupled to the snowmobile chassis and the rear end portion is coupled to the ground contacts. In the preferred embodiment, the front end portion is pivotally coupled to the chassis via an elongated front cross shaft, which provides a centerline of rotation for the swing arm. A tensioner is provided that adjustably couples the rear end portion of the swing arm to the ground contact(s). The tensioner is independently extendable and retractable during articulation of the suspension assembly.

Front and rear resilient members are also provided in the preferred embodiment of the suspension assembly. The upper end of the front resilient member is pivotally attached to a clevis that is attached to the front cross shaft. The upper end of the rear resilient member is pivotally attached to the rear cross shaft, which is in turn attached to the chassis. Thus the rear cross shaft provides a centerline of rotation for the rear resilient member. The front resilient member biases against displacement between the ground contacts and the swing arm and the front cross shaft during suspension system travel. The rear resilient member biases against displacement between the swing arm and the chassis or a rear cross shaft during suspension system travel. Both the front and rear resilient members dampen movement of the tracks to create a softer ride.

BRIEF DESCRIPTION OF THE DRAWINGS—PARENT APPLICATION

FIG. 7 is a side view of the rear suspension system independently articulating a pair of independent suspension assemblies.

FIG. 8 is a side view of the drive shaft and the rear suspension system that independently articulates the pair of independent suspension assemblies.

BRIEF DESCRIPTION OF THE DRAWINGS—PRESENT APPLICATION

Figure 14:
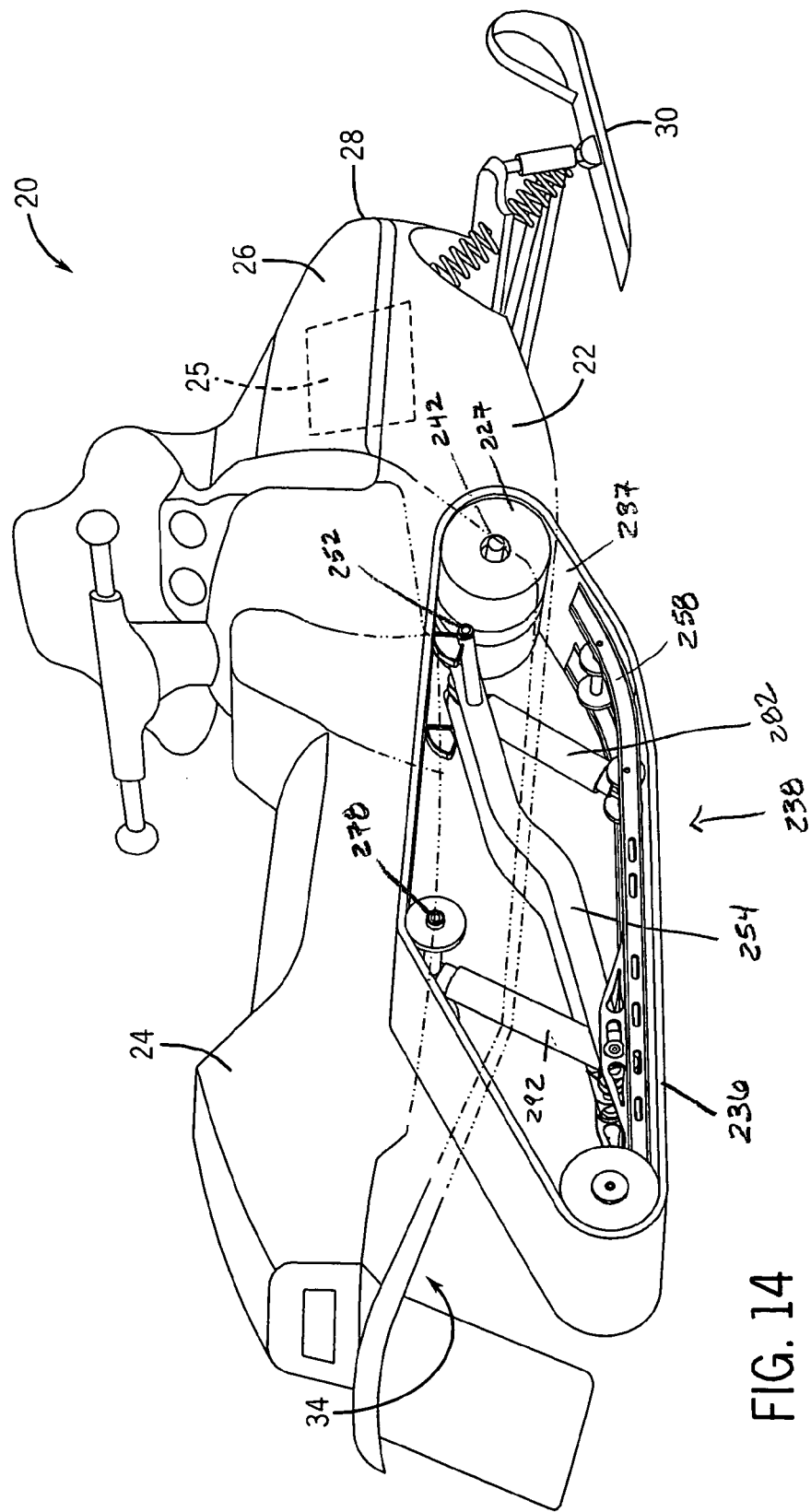

FIG. 14 is a right rear perspective view of a suspension assembly of the present application mounted in a rear tunnel of a snowmobile.

Figure 15:
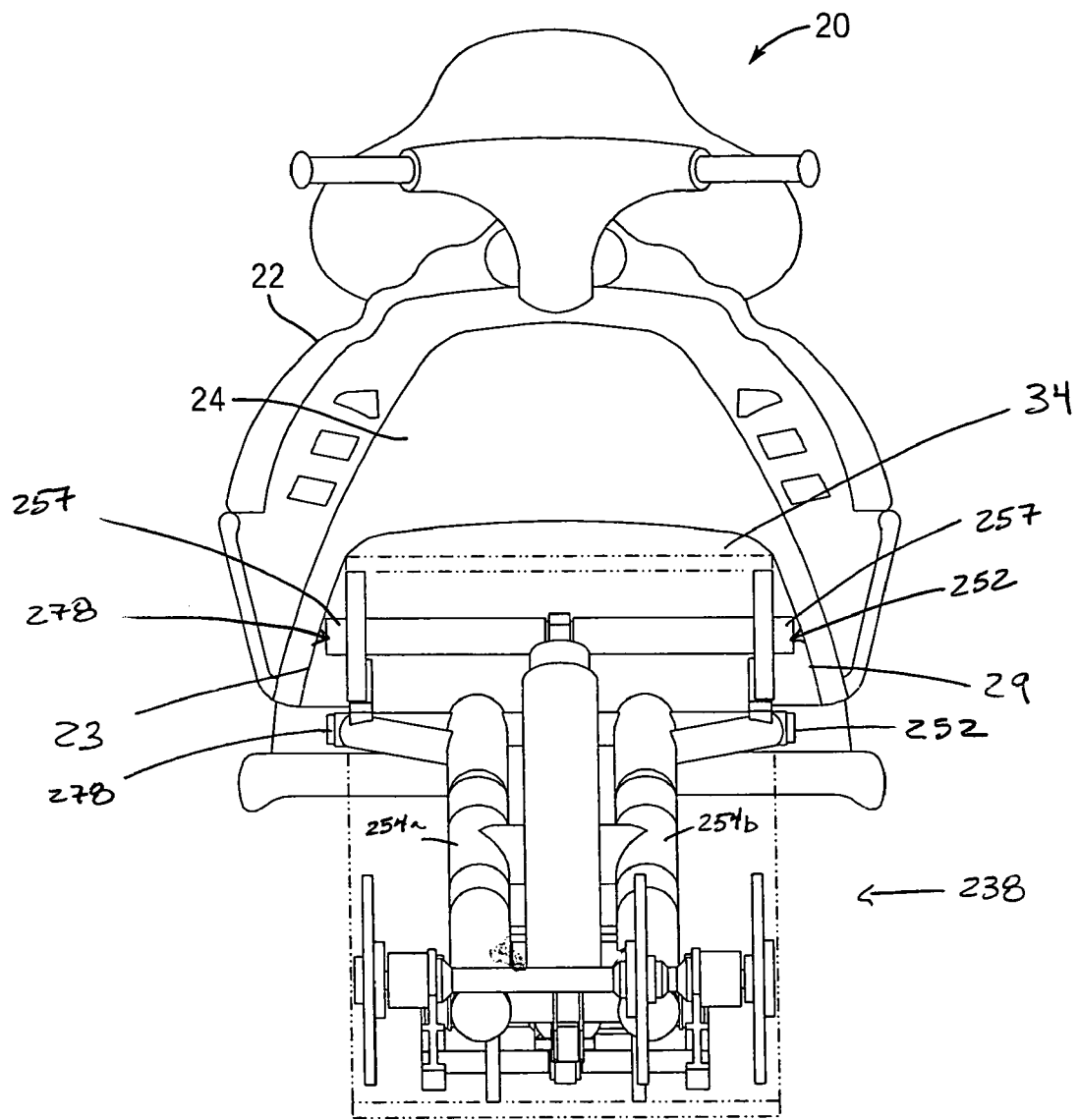

FIG. 15 is a rear view of the suspension assembly of FIG. 14 mounted in the rear tunnel.

Figure 16:
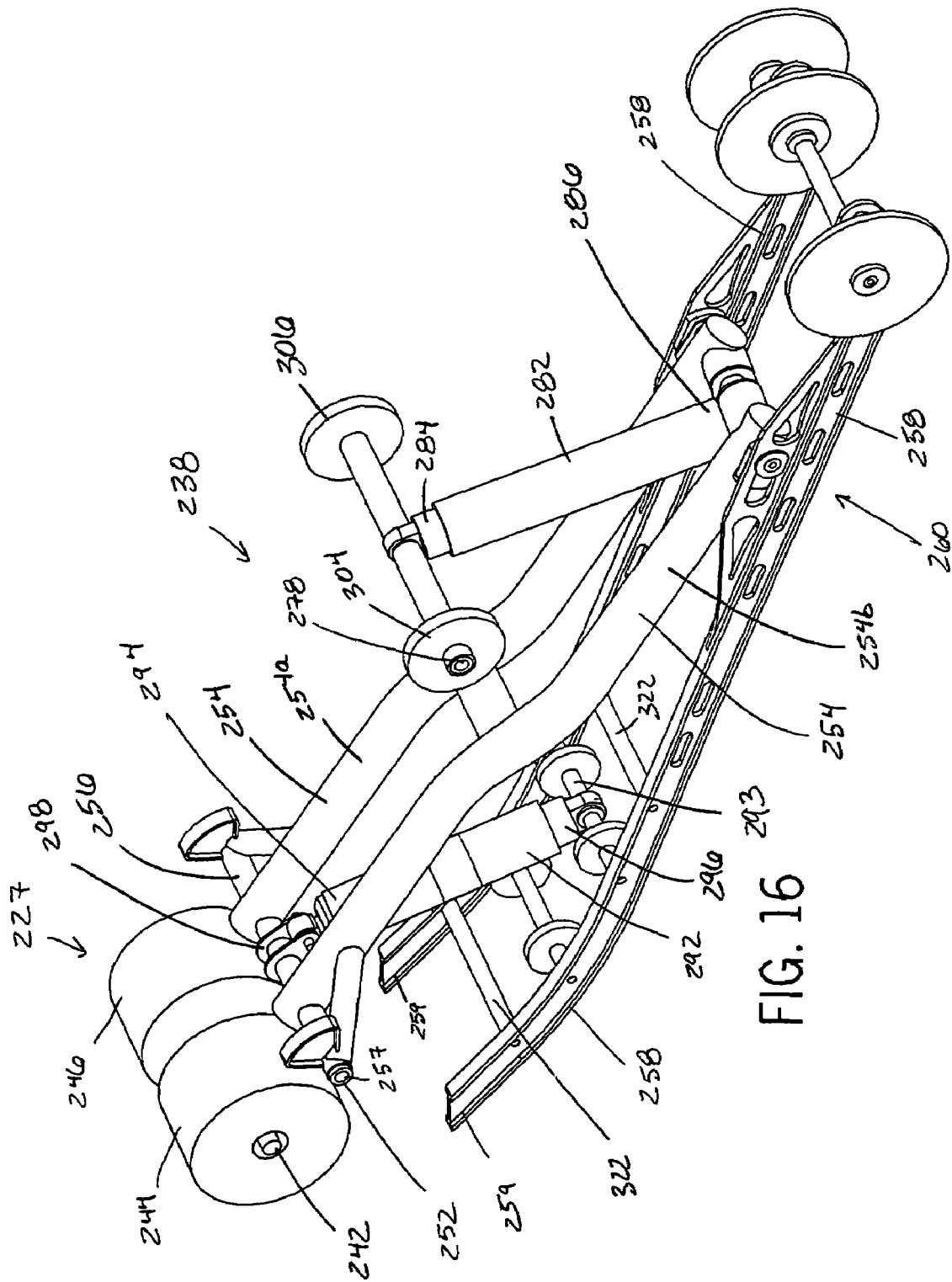

FIG. 16 is a left rear perspective view of the suspension assembly having the closed-loop track moved.

Figure 17:
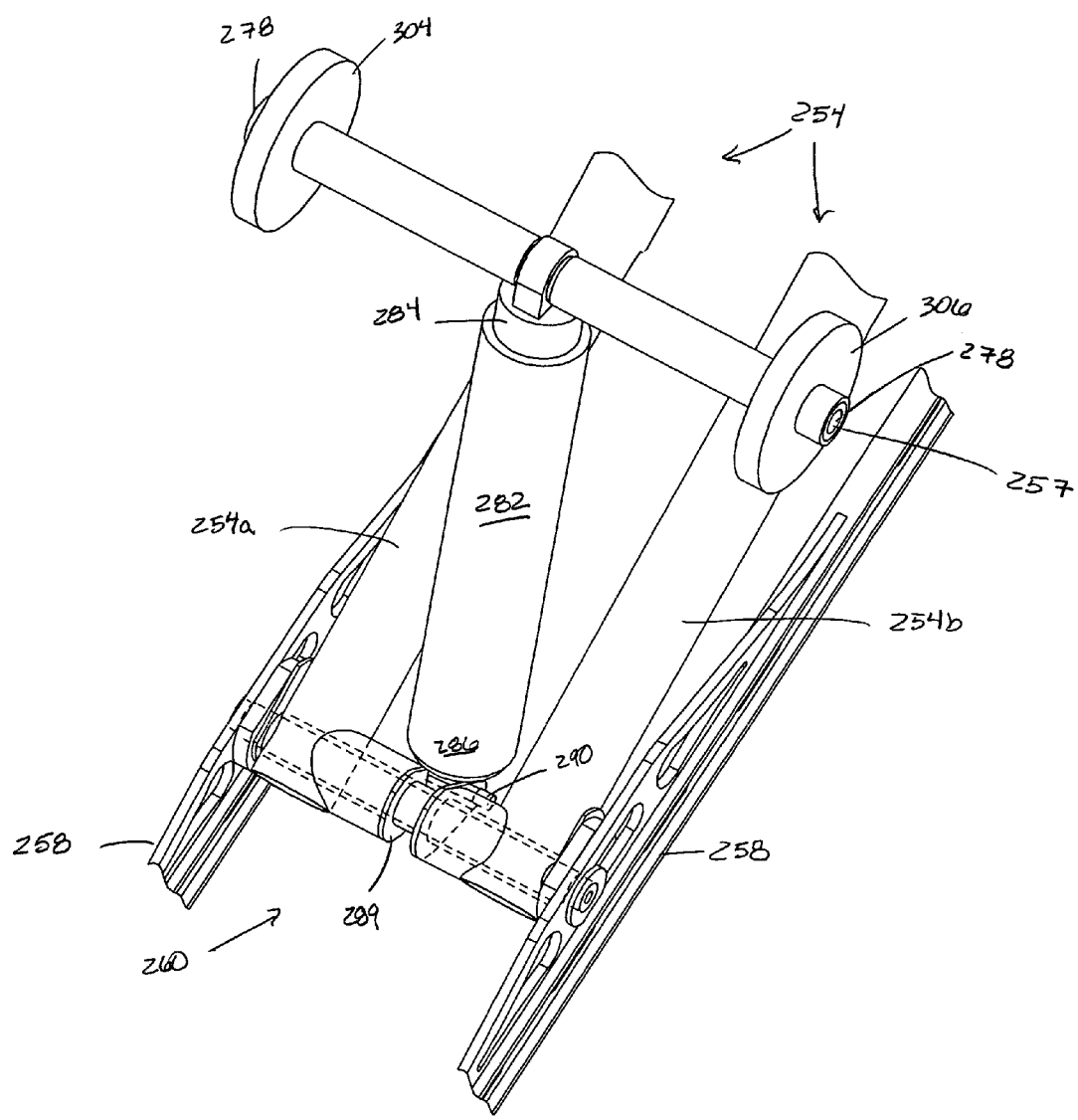

FIG. 17 is a detailed perspective view of the rear resilient member connected to the rear elongated cross shaft and the swing arm.

Figure 18:
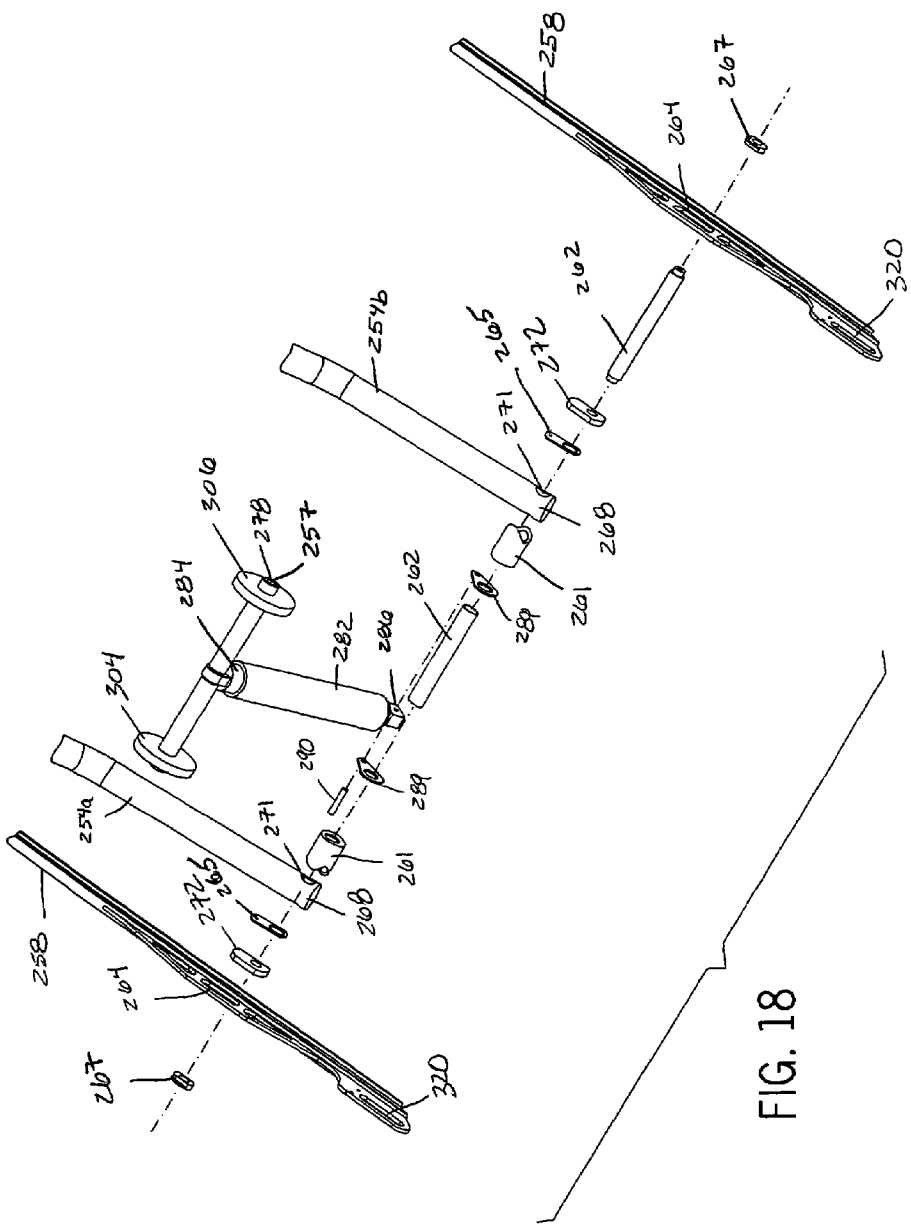

FIG. 18 is an exploded view of the arrangement of FIG. 17.

Figure 19:
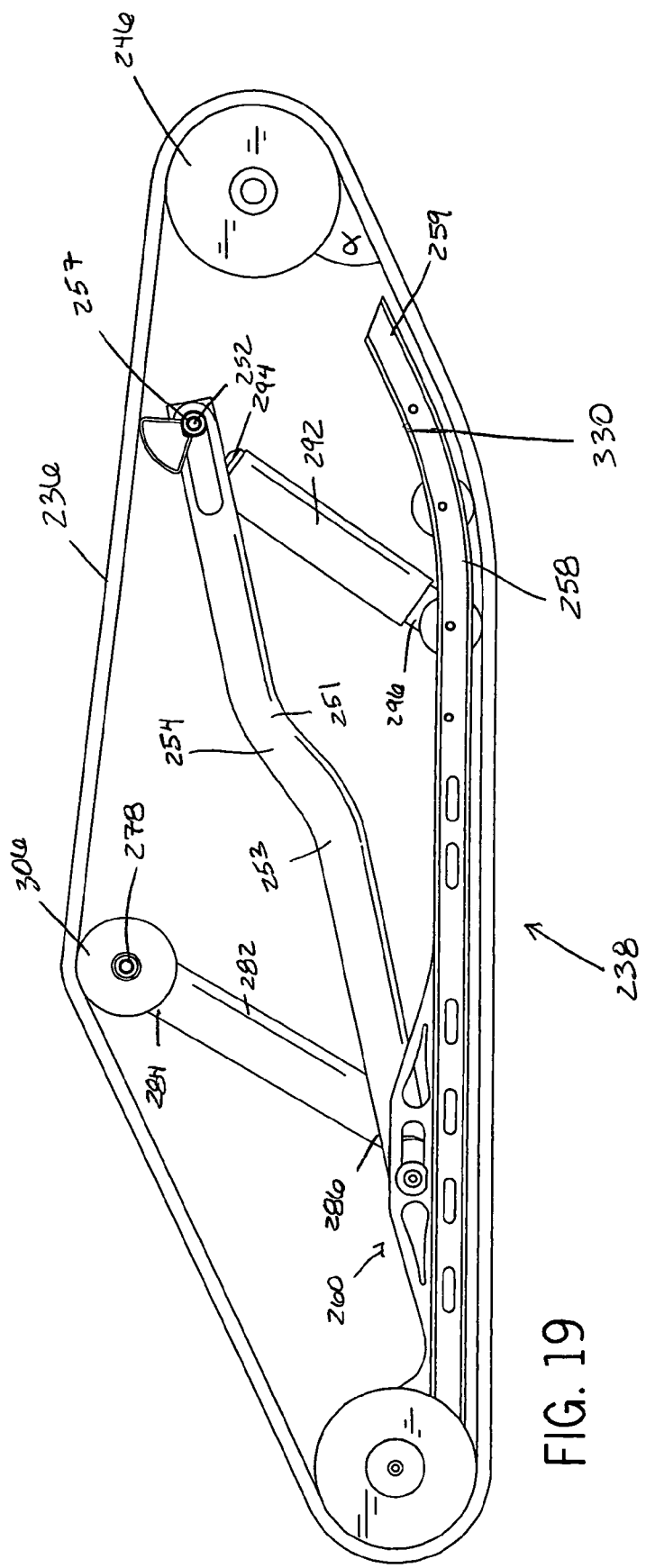

FIG. 19 is a side view of the suspension assembly disposed in the closed-loop track.

Figure 20:
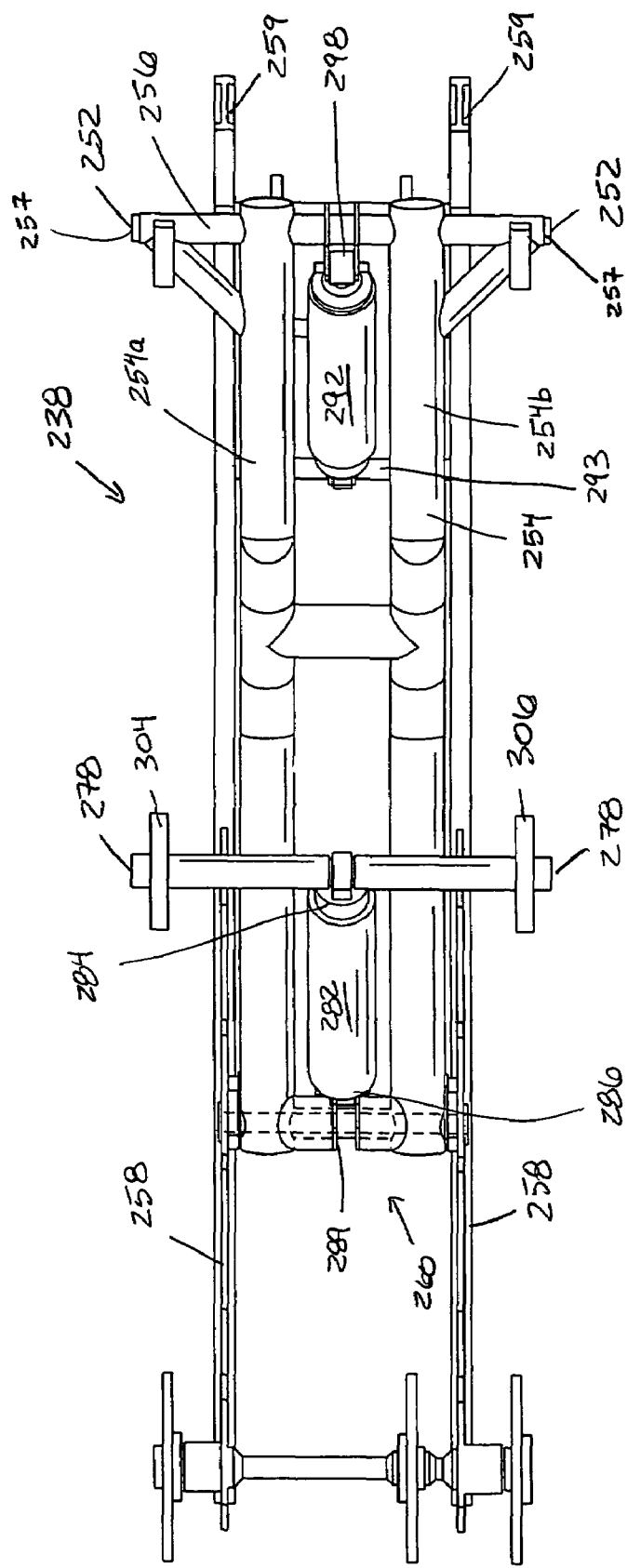

FIG. 20 is a top view of the suspension assembly.

DETAILED DESCRIPTION OF THE PREFERRED EMBODIMENTS

Parent Application

The parent application relates generally to a rear suspension system for a snowmobile. Preferred embodiments of the invention of the parent application are described in the following specification and depicted in the attached drawing FIGS. 1-13.

Figure 1:
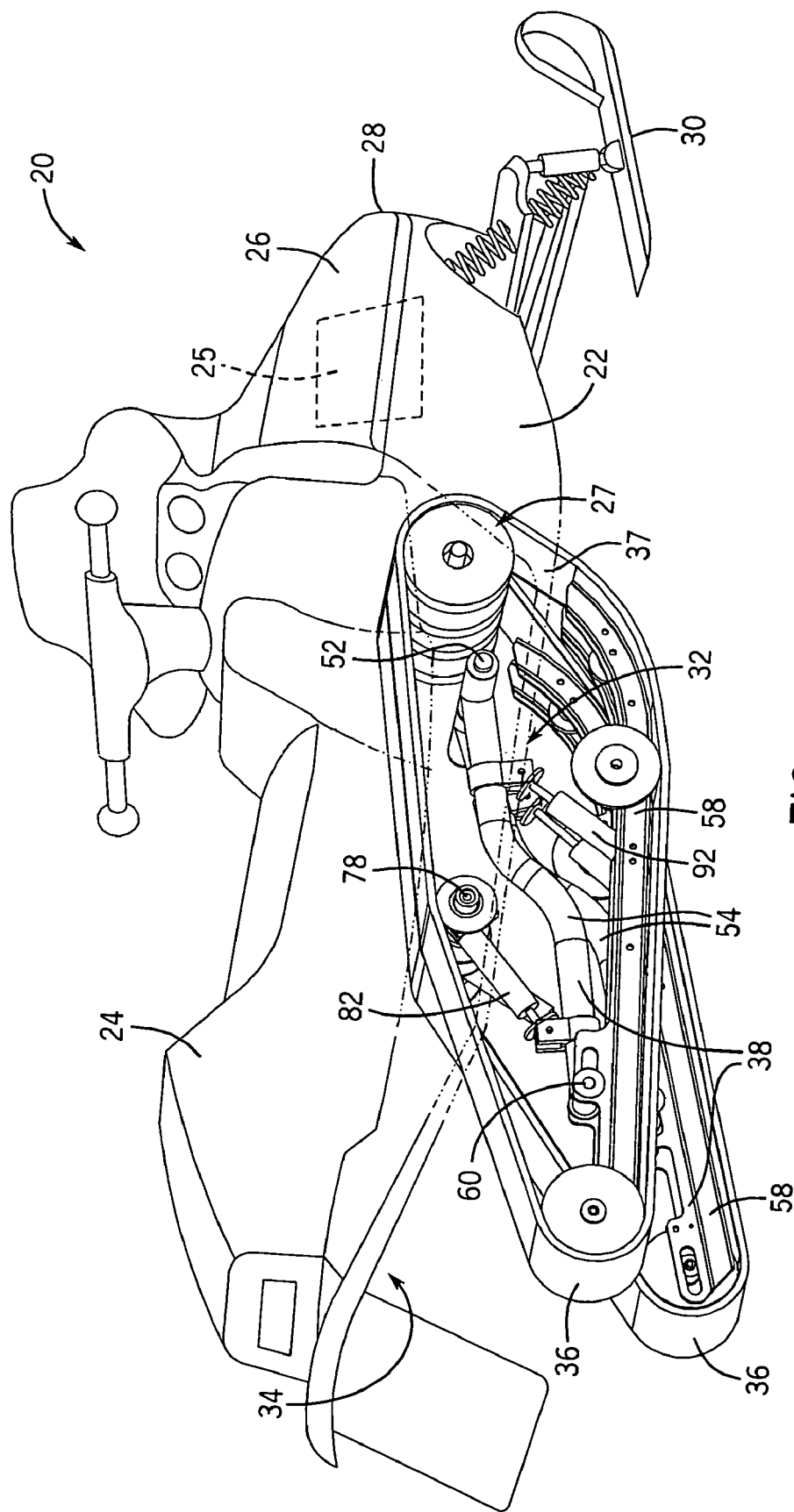
FIG. 1 is a right rear perspective view of the rear suspension system of the parent application mounted in a rear tunnel of a snowmobile.

As shown in FIG. 1, a snowmobile 20 has a chassis 22 with an elongated saddle seat 24. A power plant/engine is shown in dashed line at 25 and is located beneath engine cowling 26 at the front 28 of the snowmobile 20, which is supported by a fore-located ground contact 30. The engine 25 drives the drive system 27 in rotation, which in turn drives a pair of adjacent closed-loop tracks 36 in a selected rotational direction to propel the snowmobile in a desired direction. As will be described below in more detail, the drive system 27 may include means to drive the pair of adjacent closed-loop tracks 36 at the same speed, or may include means to selectively drive the individual closed-loop tracks 36 at different speeds to aid in operational maneuvers, such as turning.

An independent rear suspension system 32 is disposed in the rear tunnel 34 of the snowmobile 20 beneath the saddle seat 24. The independent suspension system 32 comprises various linkages and other components which will be structurally described in detail below, followed by a description of the functional interrelation thereof.

In general, the rear suspension system 32 includes the pair of adjacent closed-loop tracks 36, which are rotatably driven by the drive system 27. In addition, the rear suspension system 32 includes a pair of independent suspension assemblies 38, one disposed in each respective closed-loop track 36. The independent suspension assemblies 38 articulate independently from each other during travel of the rear suspension system 32, as will be described in detail below.

Figure 2:
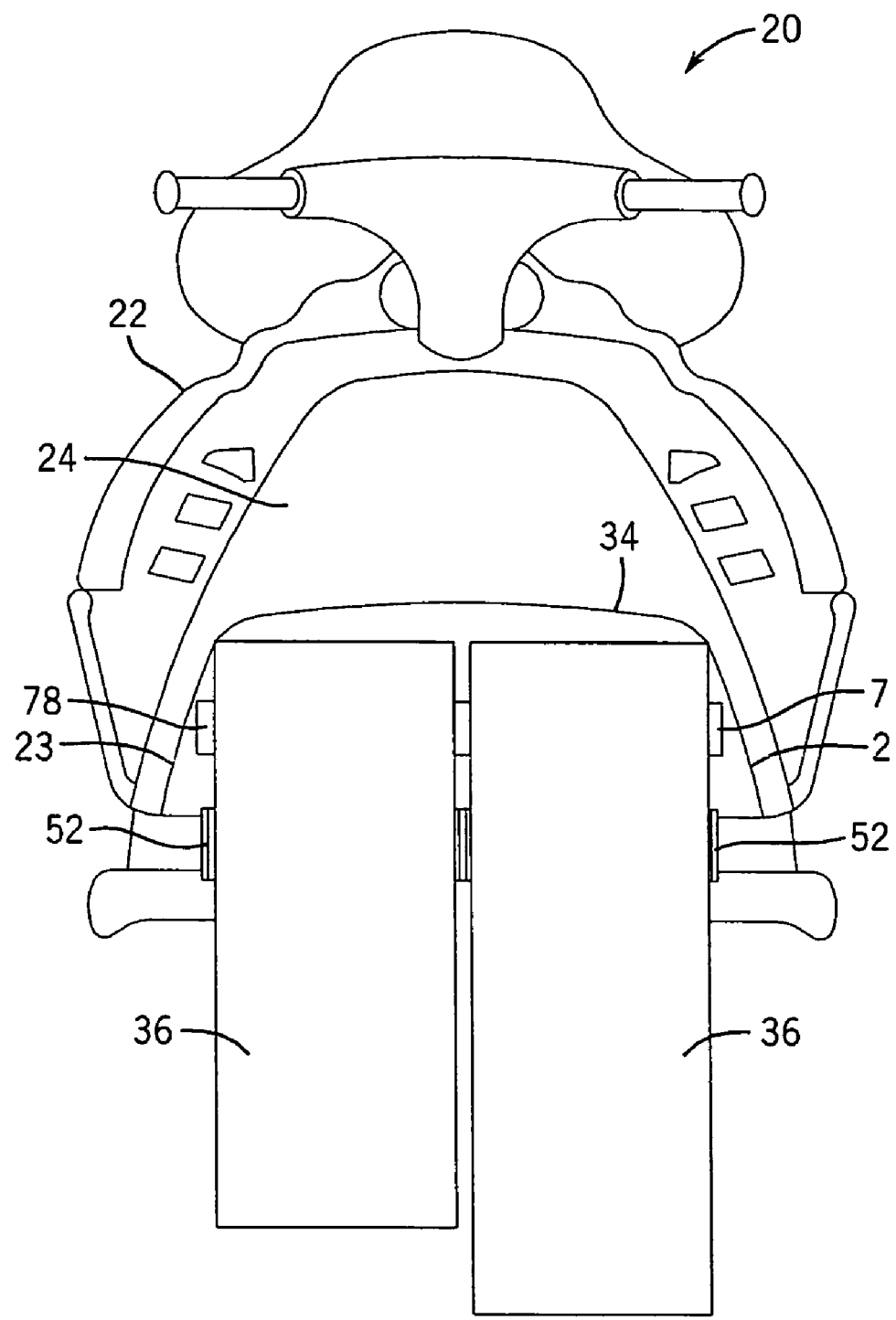
FIG. 2 is a rear view of the rear suspension system mounted in the rear tunnel.

Referring to FIG. 2, the pair of closed-loop tracks 36 are adjacent each other and are each rotatably driven by the drive system 27 within the rear tunnel 34 of the chassis 22 of the snowmobile 20. Preferably, the total combined width of the adjacent closed-loop tracks 36 is less than or equal to 17 inches, however a track width greater than 17 inches is also conceived by the parent application. The rear tunnel 34 has a left inboard side 23 and a right inboard side 25.

Figure 3:
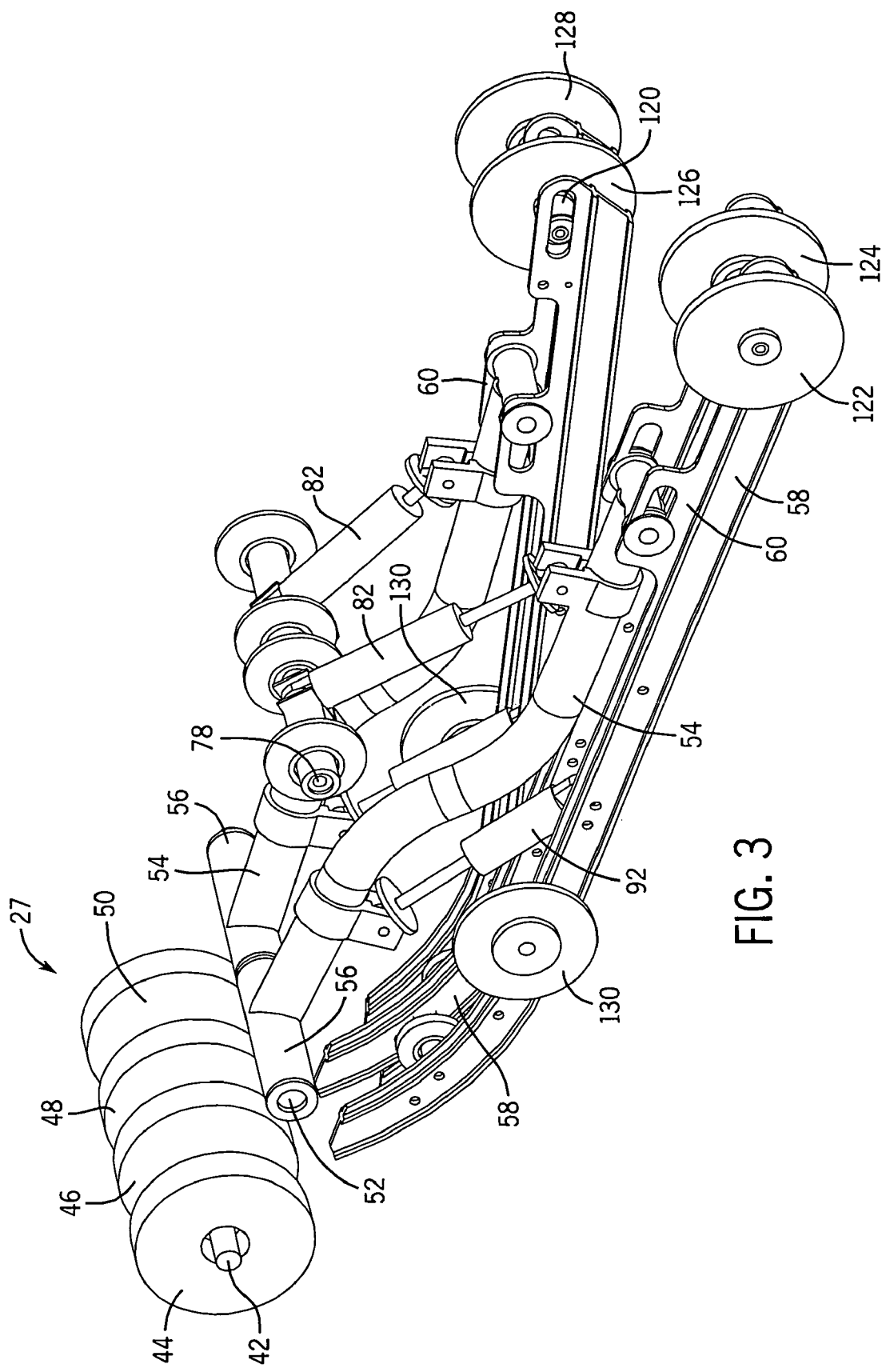
FIG. 3 is a left rear perspective view of the rear suspension system having the closed-loop tracks removed.

Referring to FIG. 3, in the described embodiment, the drive system 27 includes a driveshaft 42 upon which a plurality of drive wheels are mounted. Specifically, left outboard drive wheel 44, left inboard drive wheel 46, right inboard drive wheel 48 and right outboard drive wheel 50 are rotatably driven by the driveshaft 42. Each pair of drive wheels 44, 46 and 48, 50 drive the left and right closed-loop tracks 36 respectively, in rotation to propel the snowmobile 20 in a forward or rearward direction.

Figure 4:
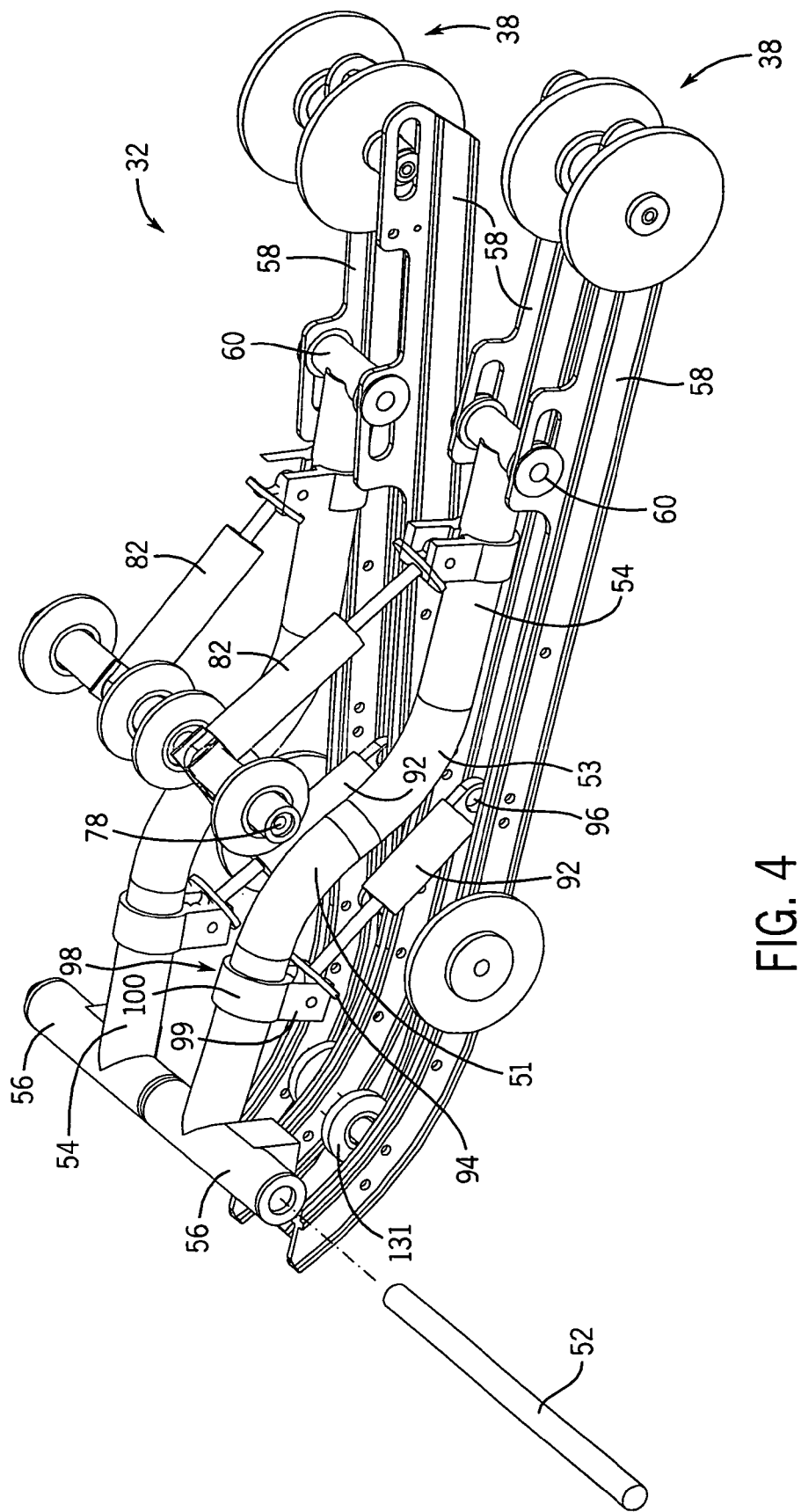
FIG. 4 is a left rear exploded view of the rear suspension system and front elongated cross shaft.

Referring to both FIGS. 2 and 4, the rear suspension system 32 employs a front elongated cross shaft 52 (shown in exploded view on FIG. 4) extending transversely through the pair of closed-loop tracks 36. Front cross shaft 52 is coupled to the chassis 22 on the left inboard side 23 and right inboard side 25 of the rear tunnel 34 (FIG. 2). Preferably, front cross shaft 52 is cylindrical and has an outer diameter of between 1 and 2 inches. As will be described further below, front cross shaft 52 provides a centerline of rotation for the pair of independent suspension assemblies 38.

Figure 6:
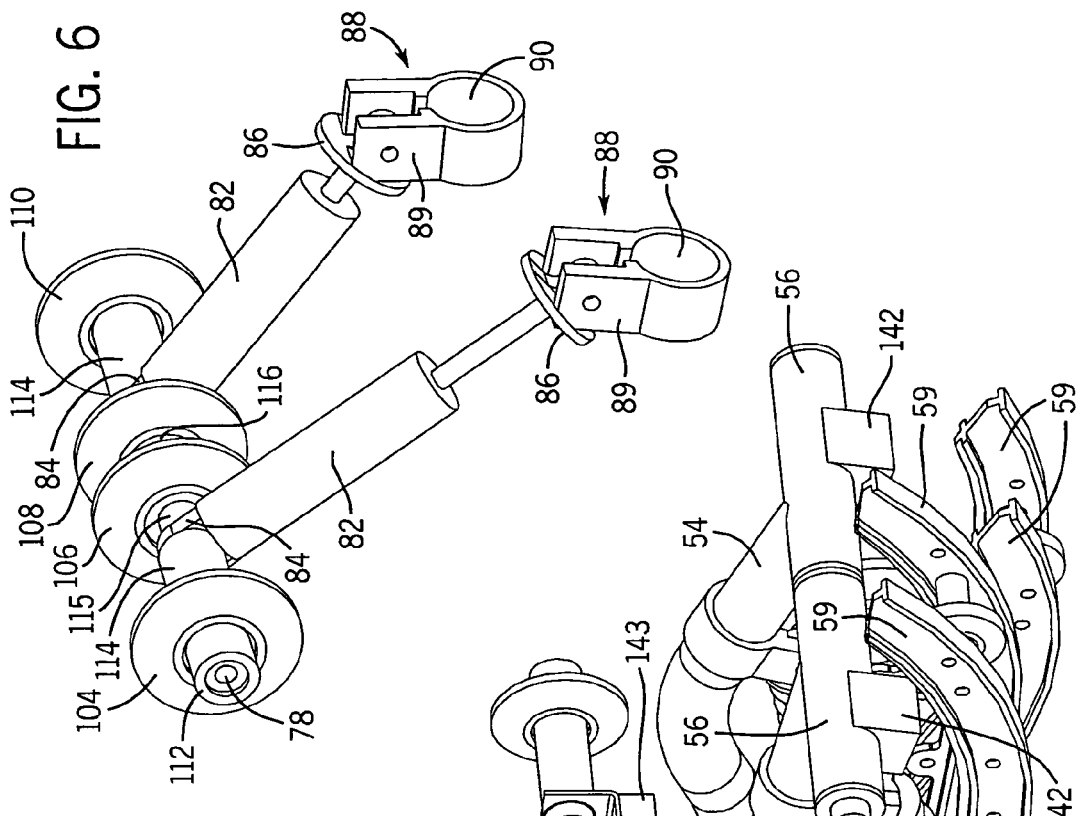
FIG. 6 is a left rear perspective view of the rear elongated cross shaft and a pair of rear resilient members rotatably coupled thereto.

Referring to both FIGS. 2 and 6, the rear suspension system 32 also employs a rear elongated cross shaft 78, which also extends transversely through the pair of closed-loop tracks 36 and is coupled to the left inboard side 23 and right inboard side 25 at the rear of tunnel 34 of the snowmobile 20 (FIG. 2). Preferably, rear cross shaft 78 is cylindrical and has an outer diameter of between 1 and 2 inches. As will be described further below, rear cross shaft 78 provides a centerline of rotation for the pair of independent suspension assemblies 38.

Returning to FIG. 4, each suspension assembly 38 has a suspension linkage or swing arm 54, which is rotatably coupled to and independently articulates about the front cross shaft 52. Each swing arm 54 has a respective transverse sleeve 56 sized to rotatably receive the front cross shaft 52. The transverse sleeve 56 is rotatably coupled to the front cross shaft 52 via opposing bushings 57 (see FIG. 5). The swing arm 54 is preferably between 16 and 36 inches long, extends transversely from the front cross shaft 52, to a first downward curved portion 51, then to a second upward curved portion 53 and then rearwardly. However the swing arm may comprise a variety of shapes and sizes. During suspension travel, the independently articulating swing arm 54 transfers suspension weight and moment amongst various independent linkages to support the snowmobile 20 and provide a smooth ride. The functional interrelation between these various suspension components will be described in detail below.

Referring now to FIG. 7, each suspension assembly 38 has a pair of elongated ground contacts, or skid rails 58, upon which the pair of closed-loop tracks 36 rotate. Although in the preferred embodiment a pair of ground contacts 58 are employed, it is conceived that each suspension assembly 38 could employ a single ground contact or three or more ground contacts. The ground contacts 58 are longitudinal members having curved fore end tips 59 and each ground contact 58 resides within a closed-loop track 36. As the closed-loop tracks 36 are driven in rotation by the drive system 27, the inner surface 37 (FIG. 1) of the closed-loop tracks 36 slides along the longitudinal length of the ground contacts 58. Bearing the weight of the snowmobile 20, the ground contacts 58 apply pressure to the inner surface 37 of the closed-loop tracks 36 and in turn apply pressure to the ground, thus resulting in motion of the snowmobile 20. Several idler wheels, as will be described further below, further assist the translation of the closed-loop tracks 36 along the ground contacts 58.

Figure 5:
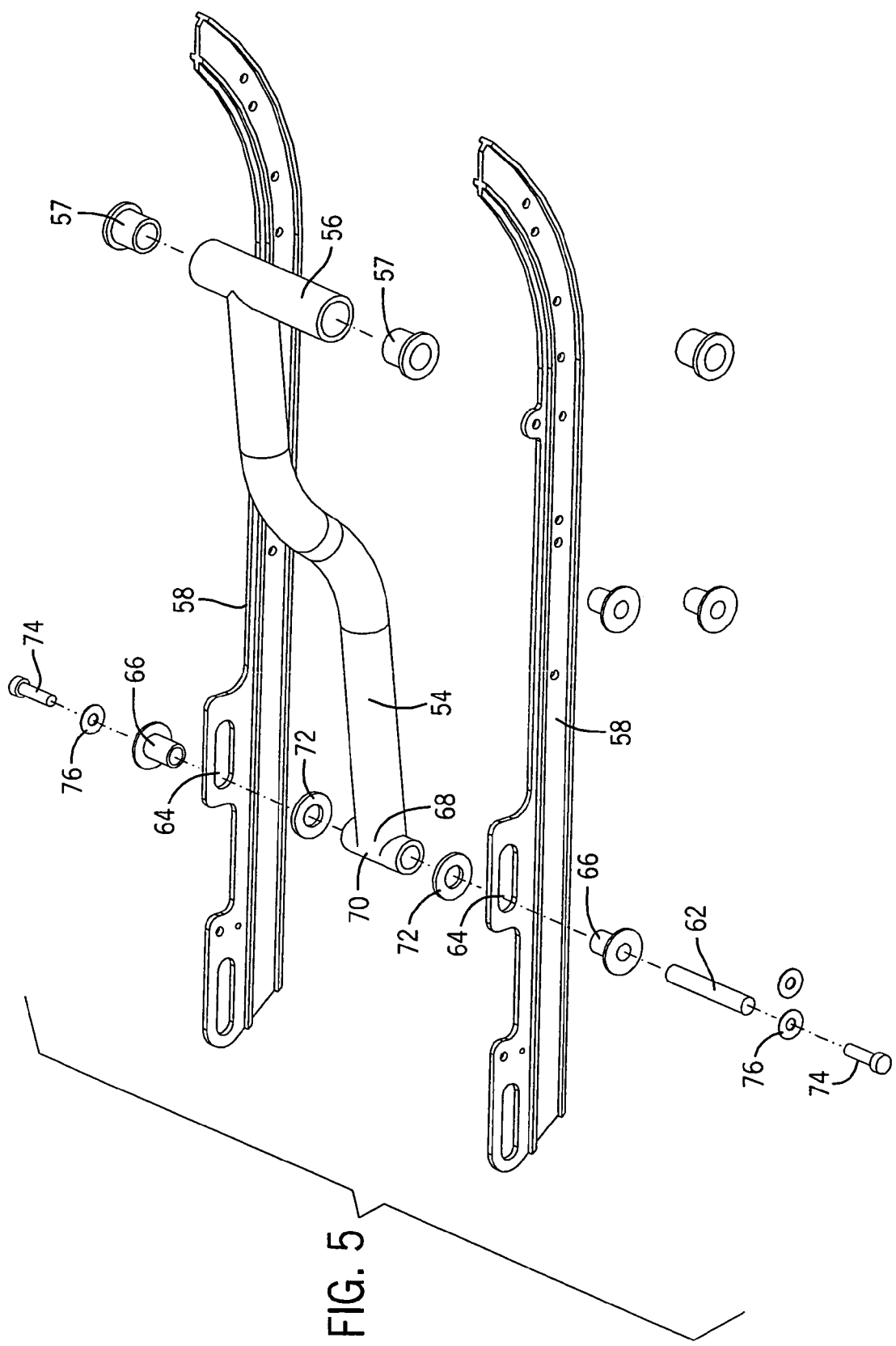
FIG. 5 is an exploded perspective view of the tensioner, swing arm and pair of elongated ground contacts.

Referring to FIGS. 3 and 5, each swing arm 54 is coupled to the pair of ground contacts 58 by a tensioner 60. The tensioner 60 comprises an elongated pin 62 disposed through elongated slots 64 formed in the pair of ground contacts 58. The rear end 68 of the swing arm 54 has a transverse sleeve 70 through which the pin 62 is disposed. A pair of inboard washers 72 are disposed on opposite sides of the transverse sleeve 70 and a pair of opposing bushings 66 are disposed on opposite outboard sides of the slots 64 in the ground contacts 58. A pair of bolts 74 and opposing outboard washers 76 rotatably secure the pin 62 to the pair of ground contacts 58 such that the swing arm 54 may rotate about the pin 62. The tensioner 60 allows the ground contacts 58 to move freely in a fore and aft direction during suspension system travel. This movement is allowed and governed by the pin 62, which slides along the slots 64. The tensioner 60 thus helps to adjust the rear suspension system 32 during suspension travel and maintain a generally uniform tension in the closed-loop track 36 as it rotates and travels along rough terrain. The tensioner 60 further helps maximize contact between the closed-loop tracks 36 and the ground being traveled. These and other aspects and purposes of the tensioner 60 will be described more fully below.

It is recognized that variations to the structure of the tensioner 60 may be employed to accomplish the same functional advantages. For example, the slots 64 may be formed in the swing arm 54 instead of in the ground contacts 58. Alternately, a single slot 64 in the swing arm 54 could be employed. In such an arrangement, the pin 62 would be attached to the ground contacts 58 and extend through the slot or slots 64 in the swing arm 54. The ground contacts 58 would thus be free to move in a fore and aft direction along the length of the slot or slots 64 during suspension travel.

Referring back to FIG. 4, a rear resilient member 82 is disposed in each of the independent suspension assemblies 38. Preferably the pair of rear resilient members 82 comprise spring and shock absorbing members, which are well known and used in the art for vehicle suspension. The rear resilient member 82 may comprise any variety of known spring and/or shock members, such as ride springs, coil springs, and/or multiple types of known shock absorbers. As shown in an alternate embodiment depicted in FIGS. 10 and 11, the rear resilient member 82 comprises a coil over spring element 180.

Referring to both FIGS. 3 and 6, the rear resilient members 82 each have a first end 84 rotatably coupled to the rear cross shaft 78 and a second end 86 pivotally coupled to a clevis connector 88, which is adjustably coupled to the swing arm 54. The pair of rear resilient members 82 bias independently of each other against displacement between the rear cross shaft 78 and the swing arm 54 during rear suspension system 32 travel and resiliently support and dampen movement of the closed-loop tracks 36 to soften the ride of the snowmobile 20.

The clevis connector 88 comprises a clevis 89 which pivotably connects to the second end 86 of the rear resilient member 82, and an adjustable clamp 90 which couples the second end 86 of the rear resilient member 82 to selected positions along the swing arm 54. Adjustment of the position of the adjustable clamp 90 along the swing arm 54 changes the ride characteristics and height of the snowmobile 20. When the clevis connector 88 is positioned along the swing arm 54 towards the tensioner 60, the rear end of the snowmobile is positioned closer to the ground and ride softens. Alternately, when the clevis connector 88 is positioned along the swing arm 54 towards the upward curved portion 53, the height of the rear portion of the snowmobile is increased and the ride stiffens. Although the clevis connector 88 employs specific means for adjustably coupling the linkages to the swing arm 54, it is conceived that various mechanisms for achieving the same ends, such as screws, bolts, rack and pinions, T-slots, and various other types of mechanisms, may be employed.

Referring to FIG. 4, a front resilient member 92 is disposed in each of the independent suspension assemblies 38. Preferably the pair of front resilient members 92 comprise spring and/or shock absorbing members, which are well known and used in the art for vehicle suspension. The front resilient members 92 may comprise a variety of known spring and/or shock members, such as ride springs, coil springs, air springs, and/or multiple types of shock absorbers. In an alternative embodiment shown in FIGS. 10 and 11, the front resilient member 92 comprises a coil over spring element 182.

The front resilient members 92 have a first end 94 coupled to the swing arm 54 and a second end 96 coupled to the respective pair of ground contacts 58. Each of the front resilient members 92 bias independently of each other against displacement between the swing arm 54 and the pair of ground contacts 58 during rear suspension system 32 travel to resiliently support and dampen movement of the tracks and soften the ride of the snowmobile 20.

A clevis connector 98 pivotably couples the first end 94 of the front resilient member 92 to the swing arm 54. The clevis connector 98 comprises a clevis 99 which pivotably couples to the first end 94 of the front resilient member 92 and an adjustable clamp 100 which couples the first end 94 of the front resilient member 92 at selected positions along the swing arm 54. Adjustment of the position of the adjustable clamp 100 along the swing arm 54 adjusts ride characteristics of the snowmobile 20. Although the clevis connector 88 employs specific means for adjustably coupling the linkages to the swing arm 54, it is conceived that various mechanisms for achieving the same ends, such as screws, bolts, rack and pinions, T-slots, and multiple other types of mechanisms, may be employed.

Referring to FIGS. 4 and 7, the second end 96 of the front resilient member 92 is selectively coupled to a series of holes 102 along each pair of ground contacts 58. The second end 96 of the front resilient member 92 is held in place by a bolt (not shown), however, it is conceived that various means for providing a rotational coupling may be employed. Adjustment of the point of coupling between the second end 96 and the ground contact 58 adjusts the height and ride characteristics of the snowmobile.

The closed-loop tracks 36 are supported during rotational movement by a series of idlers rotatably attached to the ground contacts 58 and the rear cross shaft 78. The number, location and arrangement of the series of idler wheels may vary, as long as the travel of the closed-loop tracks 36 is adequately supported. In the presently described embodiment, a series of top, front, and rear idler wheels are provided.

Specifically, as shown in FIG. 6, the rear cross shaft 78 rotatably supports inboard and outboard idler wheels which rotate about the rear cross shaft 78 and provide support for the rotating closed-loop tracks 36. Specifically, left side top outboard idler wheel 104, left side top inboard idler wheel 106, right side top inboard idler wheel 108 and right side top outboard idler wheel 110 rotate about the rear cross shaft 78 and support the rotational movement of each closed-loop track 36. Opposing outboard spacers 112 retain the respective idler wheels on the cross shaft 78, which is coupled to the left and right inboard sides 23, 25 of the tunnel 34. The idler wheels are further separated by internal spacers and by the rear resilient member 82. Specifically, left side top outboard idler wheel 104 and left side top inboard idler wheel 106 are separated by the respective first end 84 of the rear resilient member 82 and spacers 114 and 115. Similarly, right side top outboard idler wheel 110 and right side top inboard idler wheel 108 are separated by the respective first end 84 of the rear resilient member 82 and spacers 114 and 115. The two pairs of inboard and outboard idler wheels 104, 106 and 108, 110 are separated by a center spacer 116.

Referring also to FIGS. 3 and 7, the rear portions 118 of each ground contacts 58 have a longitudinally elongated slot 120 in which a series of rear idler wheels are rotatably mounted and are rotatably coupled at a selected position along the slot 120 by threaded screws (not shown). Specifically, left outboard rear idler wheel 122, left rear inboard idler wheel 124, right rear inboard idler wheel 126, and right rear outboard idler wheel 128 are rotatably mounted in their respective ground contacts 58 along the slot 120.

In addition, each pair of ground contacts 58 has a front outboard idler wheel 130 and front inboard idler wheel 131 (FIG. 4) rotatably mounted thereto. Together, the rear idler wheels 122, 124, 126, 128; front idler wheels 130, 131; and top idler wheels 104, 106, 108, 110 rotatably support the pair of closed-loop tracks 36 during rotation thereof.

Turning now to FIG. 8, the operation of the independent rear suspension system 32 when the snowmobile 20 is under normal forward acceleration (see arrow 141) will be described. As the engine drives the drive system 27 in rotation, the pair of adjacent closed-loop tracks 36 are rotatably driven in a counter-clockwise direction to propel the snowmobile 20 in a forward direction 141.

In the embodiment shown in FIG. 8, as the rear suspension system 32 encounters rough terrains, the adjacent independent suspension assemblies 38*a*, 38*b* independently articulate to guide the closed-loop tracks 36, and thus the rear portion of the snowmobile 20, over the rough terrain. In the following example, the left suspension assembly 38*a* encounters rough terrain and independently articulates from the right suspension assembly 38*b*. It should be recognized that if instead, the right suspension assembly 38*b* encounters rough terrain, the right suspension assembly 38*b* independently articulates from the left suspension assembly 38*a*. For simplicity, the closed-loop tracks 36 have been removed in the view shown in FIG. 8.

When rough terrain is only encountered by the left closed-loop track and the left suspension assembly 38*a*, the left inboard and outboard ground contacts 58*a* respond independently from the right inboard and outboard ground contacts 58*b* by moving in an upward and rearward direction. This motion is independent of the right closed-loop track and right suspension assembly 38*b*. The various linkages described above control the independent motion of the left closed-loop track and left suspension assembly 38*a*.

Specifically, as left ground contacts 58*a* are independently forced upward and rearward by the rough terrain, the left front resilient member 92*a* provides resistive downward and rearward force to control the movement the left ground contacts 58*a* and force the left ground contacts 58*a* rearward. Simultaneously, the left swing arm 54*a* is free to rotate slightly counter-clockwise about the front cross shaft 52. The rearward travel of the left ground contacts 58*a* is further controlled by the left tensioner 60*a*, specifically left slots 64*a* and left pin 62*a*. This rearward movement of the left ground contacts 58*a* continues until the movement of left slots 64*a* is impeded by the left pin 62*a*, which is resiliently held in place by the left rear resilient member 82*a*. Simultaneously, left rear resilient member 82*a* is free to rotate slightly counterclockwise about the rear cross shaft 78 and also bias against the upward and rearward motion of the left ground contacts 58*a*. In this manner, the left suspension assembly 38*a* is articulated through a defined suspension travel independent from the right suspension assembly 38*b* and therein adequately adjusts to the rough terrain and provides a smooth ride. Once the snowmobile 20 has passed over the rough terrain, left front resilient member 92*a* and left rear resilient member 82*a* urge the left ground contacts 58*a* forward and downward into a selected even terrain suspension position of the snowmobile suspension system 32.

Figure 12:
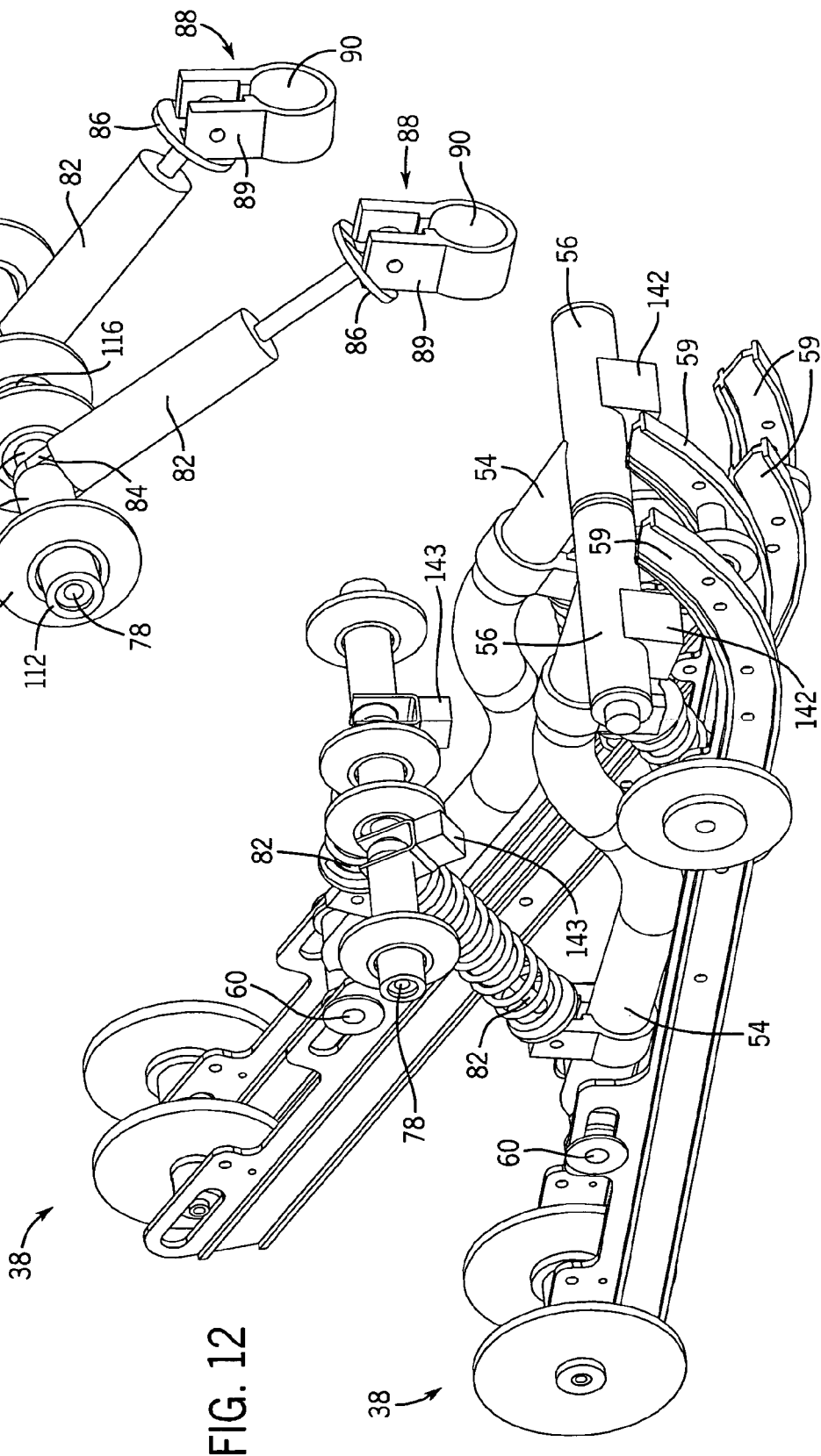
FIG. 12 is a perspective view of the rear suspension system shown in FIG. 10 having stops formed on the front and rear cross shafts.
Figure 9:
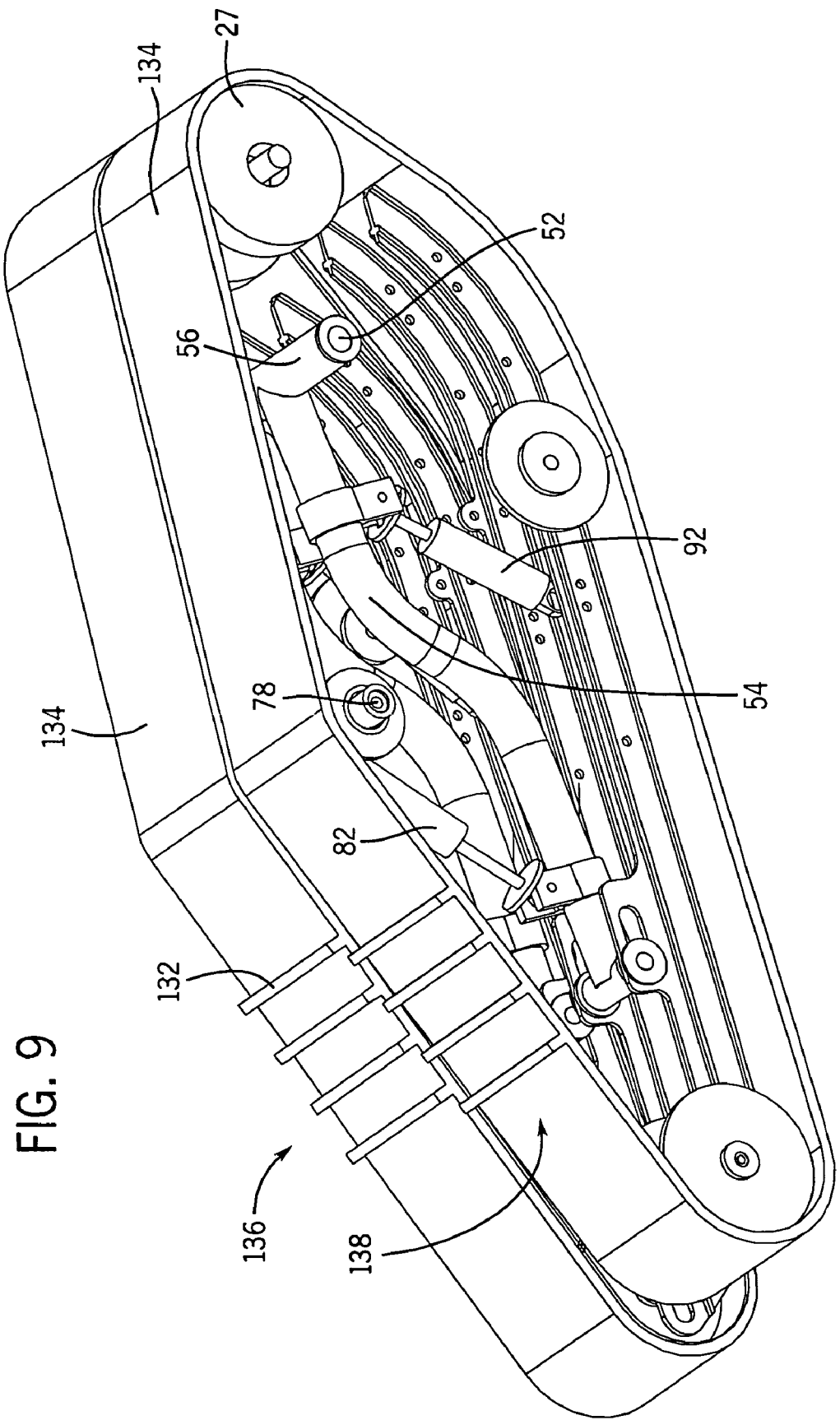
FIG. 9 is a right rear perspective view of the rear suspension system enclosed in a pair of adjacent closed-loop tracks having outer lugs formed on a portion thereof.
Figure 10:
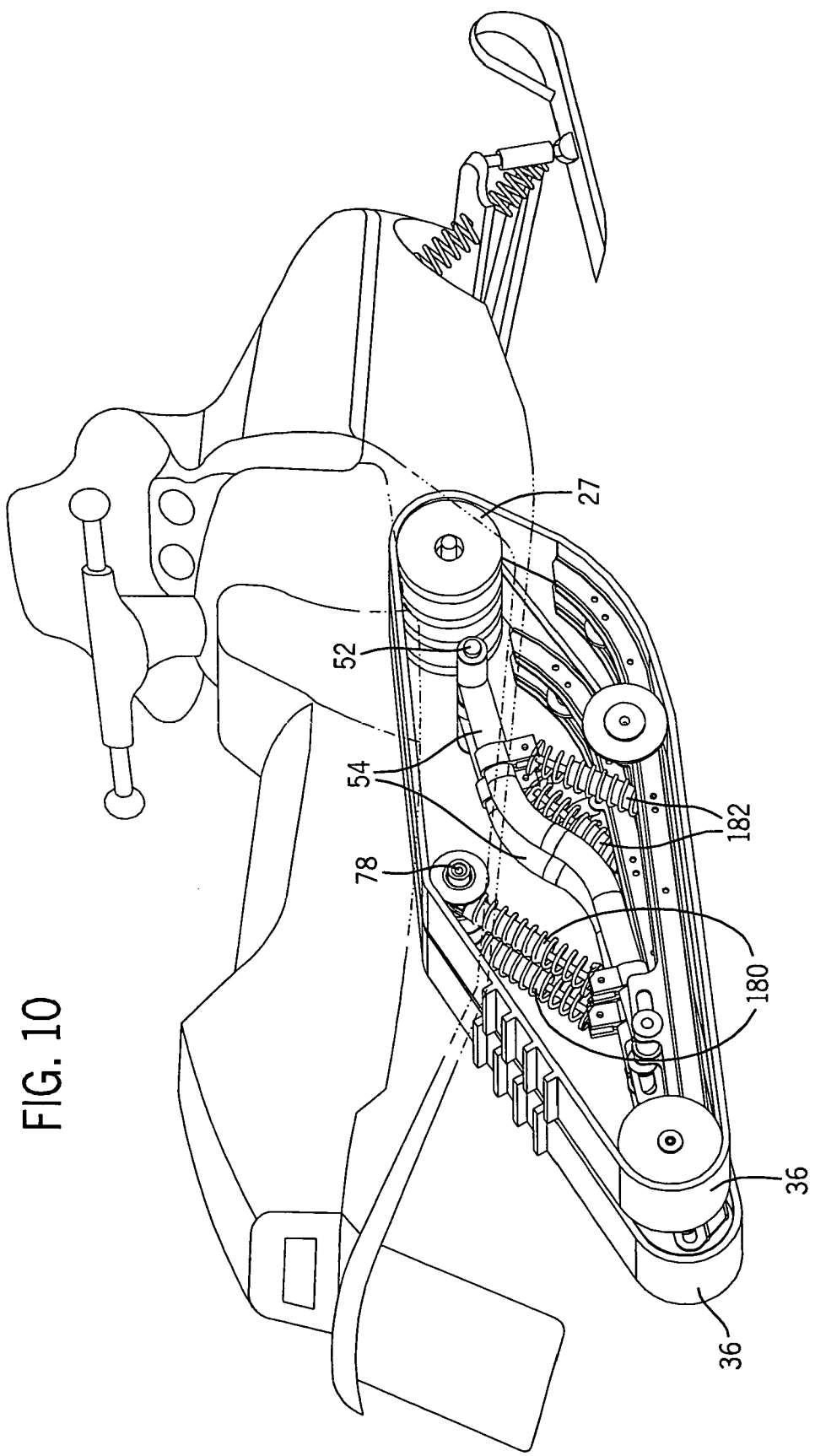
FIG. 10 is a right rear perspective view of an alternative embodiment of the rear suspension system mounted in a tunnel of a snowmobile and having coil over shock resilient members.

Referring to FIG. 12, stops 142 are coupled to the transverse sleeves 56 on the swing arms 54 and stops 143 are coupled to the rear cross shaft 78. Stops 142, 143 are preferably made of rubber or some similar resilient material. During suspension system travel, the stops 143 prevent the swing arm 54 from over-rotating and contacting rear cross shaft 78. Stops 143 are coupled to the rear resilient members 82 such that stops 143 rotate with the rear resilient members 82 during suspension system travel. This aspect advantageously aligns the stops 143 for proper contact with the swing arm 54 to prevent overrotation. The stops 142 are coupled to the transverse sleeve 56 prevent curved tips 59 of the ground contacts 58 from contacting the transverse sleeve 56 of swing arm 54.

The many benefits and advantages of the independent articulating nature of the parent application embodiments discussed above will thus be appreciated by those skilled in the art. For example, the ride and handling of the snowmobile will be substantially improved. When cornering, the system allows a substantial portion of the outside closed-loop tracks to remain in contact with the ground, thus providing better traction and control. This advantageously overcomes limitations of the single-track suspensions shown in prior art, wherein during cornering the outside edge of the single track bears the entire weight of the snowmobile.

Figure 11:
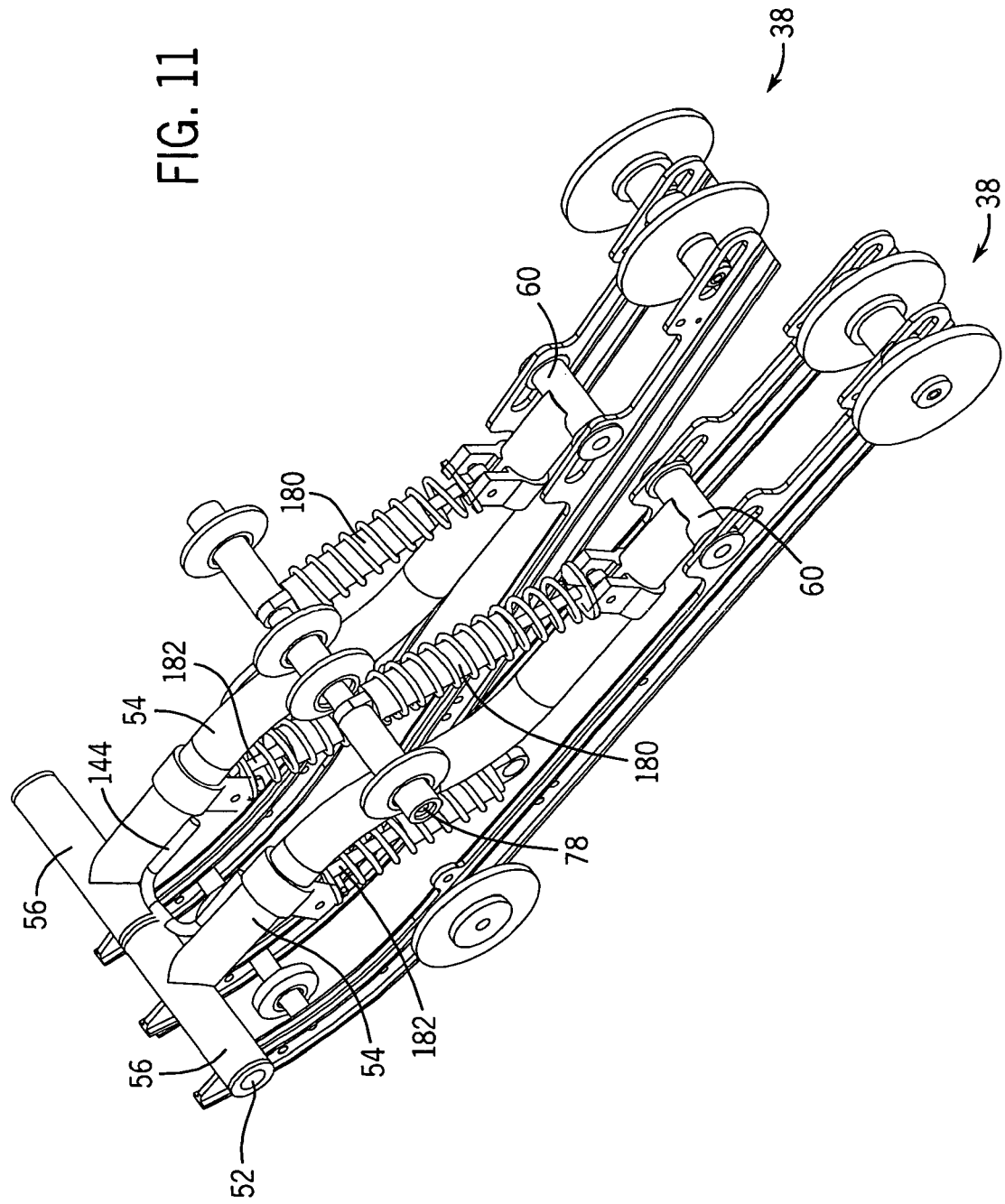
FIG. 11 is a left rear perspective view of the rear suspension system depicted in FIG. 10, having the closed-loop tracks removed therefrom.
Figure 13:
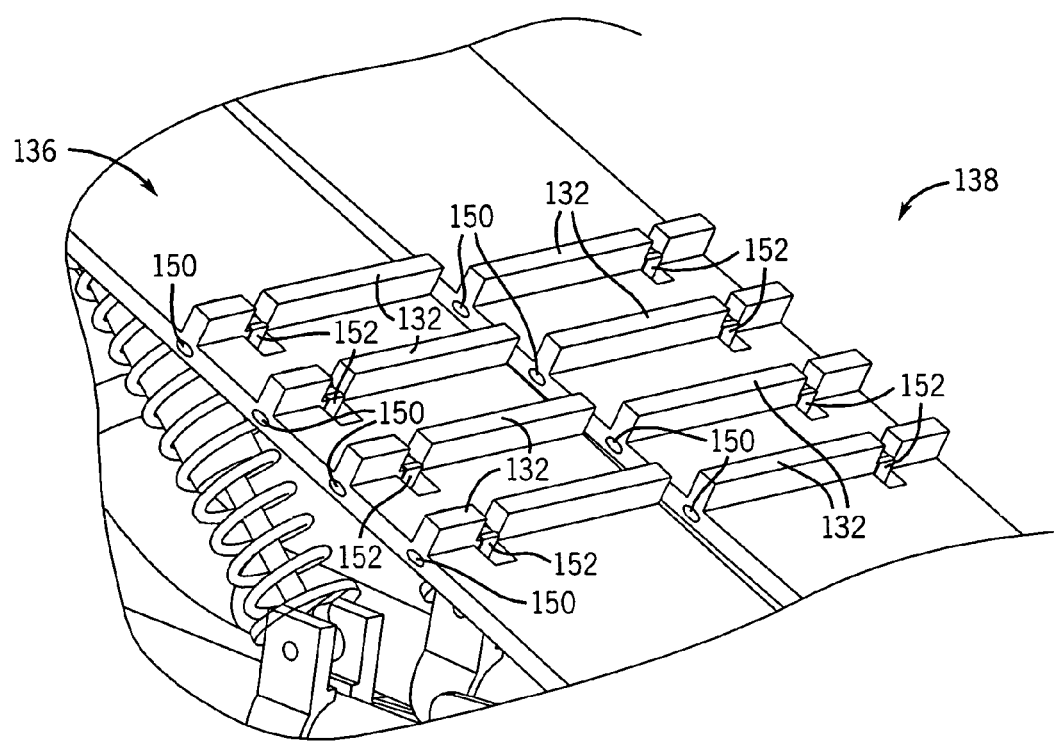
FIG. 13 is a view of outer lugs, grouser rods, and track clips on adjacent closed-loop tracks.

In the alternate embodiment of the parent application embodiments shown in FIG. 11, torsion bar 144, advantageously limits the need for the snowmobile driver to lean over the vehicle to counter cornering moments and prevent the snowmobile from tipping over. Torsion bar 144 is a U-shaped member coupled to the transverse sleeves 56 of the adjacent swing arms 54. During suspension travel, torsion bar 144 distributes the force applied to a single suspension assembly across the entire suspension system. For example, as the left ground contacts 146 encounter rough terrain and begin to lift, causing the swing arm 54 to rotate about the front cross shaft 52, the torsion bar 144 causes the adjacent swing arm 54 to also rotate slightly, thus distributing moment across the suspension system.

An alternate embodiment of the parent application also provides the ability to utilize independently driven, rear closed-loop tracks. For example, the pair of closed loop tracks 36 may be powered by a split drive system, which provides different rotational power and speed to each of the adjacent closed loop tracks 36. The relative speed of the adjacent closed-loop tracks 36 can be selected based upon drive system inputs, such as steering. In addition, the relative speed of the adjacent closed-loop tracks may also be controlled using known theories of posi-traction, wherein if one closed-loop track encounters resistance from, for example rough terrain, power is removed from the one track and provided to a remaining track or tracks. Such an arrangement further improves traction and control.

An alternate embodiment of the parent application further provides the ability to utilize independent rear braking means. Various independent braking means known in the art may be utilized with the independent rear suspension system of the present invention to improve braking ability and thus improve handling of the vehicle.

An alternate embodiment of the parent application further provides the ability to limit vibration and noise generated by the closed-loop tracks 36 during snowmobile 20 travel. Vibration and noise can be limited by offsetting the track lugs, grouser rods, and track clips on adjacent closed-loop tracks such that these obstructions do not contact the ground contacts 58 at the same time during rotation of the closed-loop tracks 36. For example, referring to FIGS. 9 and 13, a plurality of outer lugs 132 are disposed on the outer surface 134 of the closed-loop tracks 36. A plurality of inner grouser rods 150 are disposed on the inner surface of the closed loop tracks 36. Further each track has a plurality of track clips 152 for engaging the drive system 27. When adjacent tracks are aligned and adjacent outer lugs 132, grouser rods 150 and track clips 152 encounter the drive system and the ground contacts in unison, a significant amount of undesirable vibration is created.

According to an embodiment in the parent application, a first group 136 of outer lugs, grouser rods 150 and track clips 152 are offset from a second group 138 of outer lugs 132, grouser rods 150 and track clips 152 on an adjacent track. Because outer lugs 132, grouser rods 150 and track clips 152 in the first group 136 are offset from the outer lugs 132, grouser rods 150 and track clips 152 in the second group 138, during rotation each of these items encounter the adjacent suspension assemblies and the ground at different times, thus minimizing vibration and providing a smoother ride. Although the outer lugs 132, grouser rods 150 and track clips 152 are only shown on a portion of the outer surface 134 of the closed-loop tracks 36, it is recognized that these elements may extend around the entire inner and outer surfaces, or portions thereof, of the closed-loop tracks 36.

DETAILED DESCRIPTION OF THE PREFERRED EMBODIMENTS

Present Application

Preferred embodiments of the present application are described as follows and are depicted in the attached drawing FIGS. 14-20. It should be understood that the drawings and specification are to be considered an exemplification of the principles of the invention, which is defined in the appended claims. The specification and drawings are not intended to limit the broad aspects of the invention to the embodiments illustrated.

It should also be noted that many of the structural aspects of the embodiments shown in FIGS. 14-20 that correspond to the same or similar structures disclosed in the parent applications are indicated by like reference numbers in the 200-300 series.

As shown in FIGS. 14 and 15, the snowmobile 20 has a chassis 22 with an elongated saddle seat 24. A power plant/engine is shown in dashed line at 25 and is located beneath engine cowling 26 at the front 28 of the snowmobile 20, which is supported by a fore-located ground contact 30. The engine 25 drives the drive system 227 in rotation, which in turn drives a closed-loop track 236 in a selected rotational direction to propel the snowmobile in a desired direction. A closed-loop track 236 is rotatably driven by the drive system 227 within the rear tunnel 34 of the chassis 22 of the snowmobile 20. The rear tunnel 34 has a left inboard side 23 and right inboard side 29.

Referring to FIG. 16, the drive system 227 includes a drive shaft 242 upon which a plurality of drive wheels are mounted. In the embodiment shown, left drive wheel 244 and right drive wheel 246 are rotatably driven by the drive shaft 242. The drive wheels 244, 246 drive the closed-loop track 236 in rotation to propel the snowmobile 20 in a forward or rearward direction. It will be recognized by those skilled in the art that a different number of drive wheel(s) or a separate means for driving the track may be employed within the scope of the invention claimed herein below.

As shown in FIG. 15, suspension assembly 238 is disposed in the rear tunnel 34 of the snowmobile 20 beneath the saddle seat 24 and articulates during travel of the snowmobile 20. The assembly 238 is arranged to maintain tension in the rotating track and yet allow for increased contact between the outer track area and the ground during snowmobile travel over rough terrain and during snowmobile acceleration and deceleration. The assembly 238 comprises various linkages and other components which will be structurally described in detail below, followed by a description of the functional interrelation thereof.

In the embodiment shown in the drawings, the suspension assembly 238 employs a front elongated cross shaft 252 extending transversely through the closed-loop track 236. Front cross shaft 252 is coupled to the chassis 22 on the left inboard side 23 and right inboard side 29 of the rear tunnel 34 (see FIG. 15). Preferably, front cross shaft 252 is cylindrical and has an outer diameter of about 1"-2". As will be described further below, front cross shaft 252 provides a centerline of rotation for the suspension assembly 238 and a means for rotatably coupling the suspension assembly 238 to the chassis of the snowmobile. However, it will be recognized by those skilled in the art that the front cross shaft 252 is not an essential structure. Rather alternate means for rotatably coupling the suspension assembly 238 to the snowmobile and supporting the assembly 238 during articulation can be employed, such as brackets, support connectors, etc.

The suspension assembly 238 shown in the figures also employs a rear elongated cross shaft, which extends transversely through the closed-loop track 236 and is coupled to the left inboard side 23 and right inboard side 29 at the rear tunnel 34 of the snowmobile 20 (see FIG. 15). Preferably, the rear cross shaft 278 is cylindrical has an outer diameter of about 1"-2". As will be described further below, the rear cross shaft 278 provides a centerline of rotation for the independent suspension assembly 238 and a means for rotatably coupling the suspension assembly 238 to the chassis of the snowmobile. However, it will be recognized by those skilled in the art that the rear cross shaft 278 is not an essential structure. Rather alternate means for rotatably coupling the suspension assembly 238 to the snowmobile and supporting the assembly 238 during articulation can be employed, such as brackets, support connectors, etc.

The suspension assembly 238 has a central suspension linkage or swing arm 254, which is rotatably coupled to the chassis 22. In the embodiment shown, the swing arm 254 is attached to the chassis 22 via the front cross shaft 252. However, any known rotatable connection between the swing arm and the front cross shaft 252 or chassis 22 may be employed to achieve the advantages provided by the present invention. Preferably, the swing arm 254 includes a transverse sleeve 256 that extends horizontally from the length of the arm 254 and is sized to rotatably receive the front cross shaft 252. The transverse sleeve 256 is further rotatably secured to the front cross shaft 252 via opposed bushings 257 (see FIG. 15).

The swing arm 254 extends transversely from the front cross shaft 252 and angularly through the closed-loop track 236. The swing arm 254 may comprise a single elongated structural member, or a member comprising a plurality of support structures. In the preferred embodiment, the swing arm is a single structural linkage that has a pair of parallel elongated structural support members 254a, 254b. The swing arm 254 may also comprise a variety of shapes and sizes, however, it is preferable that the swing arm 254 is shaped and sized such that it does not contact surrounding components during suspension travel, and specifically during its rotation about the front cross shaft 252. That is, during suspension travel, the articulating swing arm 254 transfers suspension weight and moment amongst various linkages to support the snowmobile 20 and provide a smooth ride. It is desirable to size and shape the swing arm 254 appropriately relative to the surrounding linkages and components so that contact between the arm and the linkages/components is minimized or avoided. In the embodiment shown, each member 254a, 254b of the swing arm 254 includes a first downward curved portion 251, then a second upward curved portion 253 and then extends rearwardly (FIG. 19). Such an arrangement has been found to be advantageous because contact between the swing arm and the rear cross shaft 278 is avoided when the swing arm 254 rotates about the front cross shaft 252.

Referring to FIG. 16, the lower portion of the suspension assembly 238 has a pair of elongated skid rails or ground contacts 258 upon which the closed-loop track 236 rides. Although two of ground contacts 258 are employed, it is conceived that the suspension assembly 238 could employ a single ground contact or three or more ground contacts. In the preferred arrangement, the ground contacts 258 are longitudinal members having curved fore end tips 259 and each ground contact 258 resides within the closed-loop track 236. As the closed-loop track 236 is driven in rotation by the drive system 227, the inner surface 237 (FIG. 14) of the closed-loop track 236 slides along the longitudinal length of the ground contacts 258. Bearing the weight of the snowmobile 20, the ground contacts 258 apply pressure to the inner surface 237 of the closed-loop track 236 and in turn apply pressure to the ground, thus resulting in motion of the snowmobile 20. Several idler wheels, as will be described further below, assist the translation of the closed-loop track 236 along the ground contacts 258.

Referring to FIGS. 16 and 19, a front resilient member 292 is disposed in the independent suspension assembly 238. Preferably, the front resilient member 292 comprises a spring and/or shock absorbing member, which are well known and used in the art for vehicle suspension. The front resilient member 292 may comprise a variety of known spring and/or shock members, such as air shocks, air springs, ride springs, coil springs, and/or multiple types of known shock absorbers. In an alternate embodiment, the front resilient member 292 may comprise a coil over spring element. Most preferably the front resilient member 292 comprises an internal floating piston. The front resilient member 292 biases against displacement between the swing arm 254 and the pair of ground contacts 258 during rear suspension travel to resiliently support and dampen movement of the tracks and soften the ride of the snowmobile 20.

The front resilient member 292 has a first end 294 coupled to the swing arm 254 and a second end 296 coupled to the respective pair of ground contacts 258. A pivotable bracket or clevis connector 298 couples the first end 294 of the front resilient member 292 to the swing arm 254. Although the connector 298 employs specific means for adjustably coupling the linkages to the swing arm 254, it is conceived that various mechanisms for achieving the same ends, such as screws, bolts, rack and pinions, T-slots, and multiple other types of mechanism may be employed. Referring to FIGS. 16 and 19, the second end 296 of the front resilient member 292 is selectively coupled to a series of holes 302 along the pair of ground contacts 258. The second end 296 of the front resilient member 292 is held in place by a crossbar 293, however, it is conceived that various means for providing a rotational coupling may be employed. Adjustment of the point of coupling of the second end 296 along the ground contacts 258 adjusts the height and ride characteristics of the snowmobile, as will be apparent to those skilled in the art.

Referring to FIGS. 16 and 17, a rear resilient member 282 is disposed in the suspension assembly 238. Preferably, the rear resilient member 282 comprises a spring and shock absorbing member, which are well known and used in the art for vehicle suspension. The rear resilient member 282 may comprise any variety of known spring and/or shock members, such as air shocks, air springs, ride springs, coil springs, and/or multiple types of known shock absorbers. In an alternate embodiment, the rear resilient member 282 may comprise a coil over spring element. Although not shown in the drawings, the embodiment of the assembly 238 employs a remotely mounted reservoir that contains an internal floating piston. Such an arrangement for a resilient member is well-known in the art.

The rear resilient member 282 has a first end 284 rotatably coupled to the rear cross shaft 278 and a second end 286 pivotably coupled to the swing arm 254 between the support members 254a, 254b. The connection between the swing arm 254 and the second end 286 of the rear resilient member 282 is pivotable and the rear resilient member 282 biases against displacement between the rear cross shaft 278 and the swing arm 254 during suspension system travel and resiliently supports and dampens movement of the closed-loop track 236 to soften the ride of the snowmobile. As shown in FIGS. 17 and 18, the second end 286 of the rear resilient member 282 is pivotably attached to the swing arm 254 by a bracket 289 and pin 290.

Referring to FIGS. 17 and 18, the lower end portion of the swing arm 254 is coupled to the pair of ground contacts 258 by a tensioner 260. The tensioner 260 allows the ground contacts 258 to move freely in a fore and aft direction relative to the pivoting swing arm 254 during suspension system travel and thus serves to adjust the suspension assembly 238 and maintain a generally uniform tension in the closed loop track 236 as it rotates and travels along rough terrain. The tensioner 260 further helps maximize contact between the closed-loop track 236 and the ground being traveled during snowmobile movement.

It will be recognized by those skilled in the art that variations in the structure of tensioner 260 may be employed to accomplish the above functional advantages. In the embodiment shown (e.g. FIG. 19), the tensioner 260 includes a pair of elongated bars 262 that are telescopically disposed through elongated slots 264 formed in the pair of ground contacts 258. The rear ends 268 of the support members 254a, 254b have apertures 271 through which the respective pins 262 are disposed. A pair of inboard washers 272 are disposed on opposite sides of the arms 254a, 254b and a pair of opposing bushings 267 are disposed on opposite outboard sides of slots 264 in the ground contacts 258. The assembly also includes a pair of opposing spacers 265. The spacers 265 and washers 272 prevent excessive movement of the swing arm 254 from side to side. A pair of sleeves 261 are welded to the arms 254a, 254b and structurally support the connection between the swing arm 254, tensioner 260 and second end 286 of the rear resilient member 282. The sleeves 261 are formed to advantageously provide structural support to the connection without obstructing the pivoting movement of the swing arm 254 during suspension travel.

As stated above, alternate embodiments of the tensioner are possible within the scope of the present invention. As one example, the slots 264 may be formed in the swing arm 254 instead of in the ground contacts 258. The ground contacts 258 would thus be free to move in a fore and aft direction along the length of the slot or slots during suspension travel.

The closed-loop track 236 is supported during rotational movement by a series of idlers rotatably attached to the ground contacts 258. The number, location and arrangement of the series of idler wheels may vary, as long as the travel of the closed-loop track 236 is adequately supported. In the presently described embodiment, a series of top, front and rear wheels are provided.

Specifically, as shown in FIGS. 16 and 17, the rear cross shaft 278 rotatably supports inboard and outboard idler wheels which rotate about the rear cross shaft 278 and provide support for locating closed-loop track 236. Specifically, left side top outboard idler wheel 304, and right side top outboard idler wheel 306 rotate about the rear cross shaft 278 and support the rotational movement of each closed-loop track 236. Opposing spacers retain the respective idler wheels on the cross shaft 278, which is coupled to the left and right inboard sides 23, 29 of the tunnel 234. The idler wheels are further separated by internal spacers and by the rear resilient member 282.

The fore ends 259 of the ground contacts 258 preferably comprise rubber stops 330. The stops 330 are positioned to prevent the ground contacts 258 from contacting the upper end of the swing arm 254 and the front cross shaft 252 as the lower end of the suspension assembly rotates rearward and the angle α between the track and the drive wheels decreases (FIG. 19). Reference number 330 indicates the general location of the stops 330, although the actual position is selected based upon the size, shape and interrelation of the suspension linkages and components in actual use.

Referring also to FIGS. 16 and 18, the rear portions of each ground contact 258 have longitudinally elongated slots 320 in which a series of rear idler wheels are rotatably mounted at a selected position along the slot 320 by threaded screws (not shown). In addition, each pair of ground contacts has front inboard idler wheels 231 rotatably mounted thereto.

Support bars 322 extend between the pair of ground contacts to provide stability and prevent excessive scissor-like movement between the adjacent ground contacts 258 during system travel. Support bars 322 are sized, shaped and positioned so that the compliance between the ground contacts is soft enough to allow increased track contact with the ground, and yet rigid enough to prevent excessive scissor-like movement between the tracks and failure of the bars or ground contacts.

The many benefits and advantages of the articulating nature of the present invention discussed above will thus be appreciated by those skilled in the art. For example, the ride and handling of the snowmobile will be substantially improved. In addition, the assembly provides a weight reduction of 12 to 18 lbs or a 30 to 40% weight reduction over existing art without causing structural or functional failure. Also, when cornering, the invention retains tension in the closed-loop track while allowing a substantial portion of the track to remain in contact with the ground, thus providing better traction and control. For example, in the embodiment shown, the pivoting swing arm 254 and the horitonzally adjustable tensioner 260 minimize the angle α (FIG. 19) at which the track leaves the drive wheels, thereby maximizing the length of the closed-loop track contacting the ground surface. Reducing the angle improves deep snow performance. In this invention the angle is reduced whenever the suspension is displaced. This is caused by the lower portion of the suspension assembly moving rearward. In the embodiment shown the lower portion of the suspension assembly includes the ground contacts, cross shafts, idler wheels, rear wheel assembly, and lower end of the front resilient member.

It should be understood that certain changes may be made in the design and construction set forth without departing from the spirit and scope of the invention. It is intended that all matter contained in this description and shown in the drawings be interpreted as illustrative and not in a limiting sense.

It should also be understood that the following claims are intended to cover all of the generic and specific features of the invention herein described, and all statements of the scope of the invention, which as a matter of language might be said to fall therebetween.

What is claimed is:

1. A suspension assembly for a snowmobile, the snowmobile having a chassis enclosing a drive system for rotatably driving a closed-loop track in a rear tunnel of the snowmobile, the suspension assembly comprising:
at least one elongated ground contact supporting rotational travel of the closed loop track;
a swing arm angularly disposed in the closed-loop track, the swing arm including a front end portion that is pivotably coupled to the tunnel and a rear end portion coupled to the at least one ground contact;
a front resilient member disposed in the closed-loop track and having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and
a rear resilient member disposed in the closed-loop track and having an upper end pivotally coupled to the tunnel and a lower end pivotally coupled to the rear end portion of the swing arm, wherein the rear resilient member biases against displacement between the swing arm and the tunnel during suspension assembly travel;
a tensioner disposed in the closed-loop track and coupling the rear end portion of the swing arm to the at least one ground contact, the tensioner being extendable and retractable in a fore and aft direction during movement of the suspension assembly;
wherein the assembly is arranged to maintain the closed loop track at a generally uniform tension during both vertical and horizontal travel of the closed-loop track during suspension system travel; and
a front elongated cross shaft extending transversely through the closed-loop track and coupled to the chassis, wherein the front end portion of the swing arm is rotatably coupled to the chassis via the front elongated cross shaft, and the front elongated cross shaft provides a centerline of rotation for the swing arm.

2. A suspension assembly for a snowmobile, the snowmobile having a chassis enclosing a drive system for rotatably driving a closed-loop track in a rear tunnel of the snowmobile, the suspension assembly comprising:
at least one elongated ground contact supporting rotational travel of the closed loop track;

a swing arm angularly disposed in the closed-loop track, the swing arm including a front end portion that is pivotably coupled to the tunnel and a rear end portion coupled to the at least one ground contact;

a front resilient member disposed in the closed-loop track and having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member disposed in the closed-loop track and having an upper end pivotally coupled to the tunnel and a lower end pivotally coupled to the rear end portion of the swing arm, wherein the rear resilient member biases against displacement between the swing arm and the tunnel during suspension assembly travel;

a tensioner disposed in the closed-loop track and coupling the rear end portion of the swing arm to the at least one ground contact, the tensioner being extendable and retractable in a fore and aft direction during movement of the suspension assembly;

wherein the assembly is arranged to maintain the closed loop track at a generally uniform tension during both vertical and horizontal travel of the closed-loop track during suspension system travel; and a rear elongated cross shaft extending transversely through the closed-loop track and coupled to the chassis, wherein the upper end of the rear resilient member is coupled to the rear elongated cross shaft, and the rear elongated cross shaft provides a centerline of rotation for the rear resilient member.

3. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

a swing arm angularly disposed in the closed-loop track, the swing arm including a front end portion that is pivotably coupled to the tunnel and a rear end portion coupled to the at least one ground contact;

a front resilient member disposed in the closed-loop track and having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member disposed in the closed-loop track and having an upper end pivotally coupled to the tunnel and a lower end pivotally coupled to the rear end portion of the swing arm, wherein the rear resilient member biases against displacement between the swing arm and the tunnel during suspension assembly travel;

a tensioner disposed in the closed-loop track and coupling the rear end portion of the swing arm to the at least one ground contact, the tensioner being extendable and retractable in a fore and aft direction during movement of the suspension assembly;

wherein the assembly is arranged to maintain the closed loop track at a generally uniform tension during both vertical and horizontal travel of the closed-loop track during suspension system travel; and wherein the swing arm is curved such that the swing arm cannot contact a rear cross shaft during suspension travel.

4. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

a swing arm angularly disposed in the closed-loop track, the swing arm including a front end portion that is pivotably coupled to the tunnel and a rear end portion coupled to the at least one ground contact;

a front resilient member disposed in the closed-loop track and having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member disposed in the closed-loop track and having an upper end pivotally coupled to the tunnel and a lower end pivotally coupled to the rear end portion of the swing arm, wherein the rear resilient member biases against displacement between the swing arm and the tunnel during suspension assembly travel;

a tensioner disposed in the closed-loop track and coupling the rear end portion of the swing arm to the at least one ground contact, the tensioner being extendable and retractable in a fore and aft direction during movement of the suspension assembly;

wherein the assembly is arranged to maintain the closed loop track at a generally uniform tension during both vertical and horizontal travel of the closed-loop track during suspension system travel; and wherein the swing arm comprises a unitary member having a pair of elongated support members extending substantially parallel to each other.

5. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

an elongated swing arm angularly disposed in the closed-loop track, the swing arm including a front end portion that is pivotally coupled to the tunnel and a rear end portion that is pivotally coupled to the at least one ground contact;

a front resilient member having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member having an upper end pivotally coupled to the tunnel and a lower end pivotally coupled to the rear end portion of the swing arm, wherein the rear resilient member biases against displacement between the swing arm and the tunnel during suspension assembly travel;

means for tensioning the closed-loop track and adjusting the track-to-ground contact area during rotation and during both vertical and horizontal travel of the closed-loop track;

wherein the swing arm comprises a unitary member having a pair of elongated support members extending substantially parallel to each other;

wherein the pair of support members are connected intermediate their respective end portions.

6. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

an elongated swing arm angularly disposed in the closed-loop track, the swing arm including a front end portion that is pivotally coupled to the tunnel and a rear end portion that is pivotally coupled to the at least one ground contact;

a front resilient member having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member having an upper end pivotally coupled to the tunnel and a lower end pivotally coupled to the rear end portion of the swing arm, wherein the rear resilient member biases against displacement between the swing arm and the tunnel during suspension assembly travel;

means for tensioning the closed-loop track and adjusting the track-to-ground contact area during rotation and during both vertical and horizontal travel of the closed-loop track;

a pair of elongated ground contacts;

wherein the swing arm is positioned in between the ground contacts.

7. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

an elongated swing arm angularly disposed in the closed-loop track, the swing arm including a front end portion that is pivotally coupled to the tunnel and a rear end portion that is pivotally coupled to the at least one ground contact;

a front resilient member having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member having an upper end pivotally coupled to the tunnel and a lower end pivotally coupled to the rear end portion of the swing arm, wherein the rear resilient member biases against displacement between the swing arm and the tunnel during suspension assembly travel;

means for tensioning the closed-loop track and adjusting the track-to-ground contact area during rotation and during both vertical and horizontal travel of the closed-loop track;

a pair of elongated ground contacts;

wherein the lower end of the front resilient member is pivotally coupled to the pair of ground contacts via a crossbar extending between the contacts.

8. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

an elongated swing arm angularly disposed in the closed-loop track, the swing arm including a front end portion that is pivotally coupled to the tunnel and a rear end portion that is pivotally coupled to the at least one ground contact;

a front resilient member having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member having an upper end pivotally coupled to the tunnel and a lower end pivotally coupled to the rear end portion of the swing arm, wherein the rear resilient member biases against displacement between the swing arm and the tunnel during suspension assembly travel;

means for tensioning the closed-loop track and adjusting the track-to-ground contact area during rotation and during both vertical and horizontal travel of the closed-loop track;

a pair of elongated ground contacts;

at least one cross bar that connects the ground contacts to provide compliance between the ground contacts that is soft enough to allow increased track contact with a traveled surface, and yet rigid enough to prevent excessive scissor-like movement between the contacts and failure of the cross bar or ground contacts.

9. The suspension assembly of claim 1, wherein the swing arm comprises a sleeve that extends transversely to the angular disposition of the swing arm and that is rotatably secured to the front cross shaft.

10. The suspension assembly of claim 8, wherein the second end of the front resilient member is held in place by the cross bar.

11. The suspension assembly of claim 10, wherein the point of connection between the cross bar and the ground contacts is adjustable.

12. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

a swing arm angularly disposed in the closed-loop track, the swing arm including a front end portion that is pivotably coupled to the tunnel and a rear end portion coupled to the at least one ground contact;

a front resilient member disposed in the closed-loop track and having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member disposed in the closed-loop track and having an upper end pivotally coupled to the tunnel and a lower end pivotally coupled to the rear end portion of the swing arm, wherein the rear resilient member biases against displacement between the swing arm and the tunnel during suspension assembly travel;

a tensioner disposed in the closed-loop track and coupling the rear end portion of the swing arm to the at least one ground contact, the tensioner being extendable and retractable in a fore and aft direction during movement of the suspension assembly;

wherein the assembly is arranged to maintain the closed loop track at a generally uniform tension during both vertical and horizontal travel of the closed-loop track during suspension system travel;

a pair of elongated ground contacts wherein the tensioner comprises at least one elongated bar that is telescopically disposed through elongated slots formed in the pair of ground contacts;

wherein the rear end of the swing arm comprises at least one aperture through which the elongated bar is disposed; and at least one spacer disposed on the elongated bar between the rear end of the swing arm and one of the ground contacts.

13. A suspension assembly for a snowmobile, the snowmobile having a chassis enclosing a drive system for rotatably driving a closed-loop track in a rear tunnel of the snowmobile, the suspension assembly comprising:

at least one elongated ground contact supporting rotational travel of the closed loop track;

a swing arm angularly disposed in the closed-loop track, the swing arm including a front end portion that is pivotably coupled to the tunnel and a rear end portion coupled to the at least one ground contact;

a front resilient member disposed in the closed-loop track and having an upper end pivotally coupled to the front end portion of the swing arm and a lower end pivotally coupled to the at least one ground contact, wherein the front resilient member biases against displacement between the front end portion of the swing arm and the at least one ground contact during suspension assembly travel; and a rear resilient member disposed in the closed-loop track and having an upper end pivotally coupled to the tunnel and a lower end pivotally coupled to the rear end portion of the swing arm, wherein the rear resilient member biases against displacement between the swing arm and the tunnel during suspension assembly travel;

a tensioner disposed in the closed-loop track and coupling the rear end portion of the swing arm to the at least one ground contact, the tensioner being extendable and retractable in a fore and aft direction during movement of the suspension assembly;

wherein the assembly is arranged to maintain the closed loop track at a generally uniform tension during both vertical and horizontal travel of the closed-loop track during suspension system travel; and a pair of ground contacts and at least one stop positioned to prevent contact between the ground contacts and the swing arm.

* * * * *

UNITED STATES PATENT AND TRADEMARK OFFICE
CERTIFICATE OF CORRECTION

PATENT NO.       : 7,594,557 B2                                    Page 1 of 1
APPLICATION NO.  : 11/398333
DATED            : September 29, 2009
INVENTOR(S)      : Polakowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Fourteenth Day of December, 2010

David J. Kappos
*Director of the United States Patent and Trademark Office*